US010778902B2

(12) United States Patent
Mori et al.

(10) Patent No.: US 10,778,902 B2
(45) Date of Patent: Sep. 15, 2020

(54) SENSOR CONTROL DEVICE, OBJECT SEARCH SYSTEM, OBJECT SEARCH METHOD, AND PROGRAM

(71) Applicant: TOYOTA JIDOSHA KABUSHIKI KAISHA, Toyota-shi (JP)

(72) Inventors: Yuto Mori, Toyota (JP); Shintaro Yoshizawa, Nagoya (JP); Kei Yoshikawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/395,300

(22) Filed: Apr. 26, 2019

(65) Prior Publication Data
US 2019/0379836 A1    Dec. 12, 2019

(30) Foreign Application Priority Data
Jun. 6, 2018    (JP) ................. 2018-108599

(51) Int. Cl.
*H04N 5/232*    (2006.01)
*G06T 7/62*    (2017.01)
*G06T 7/70*    (2017.01)

(52) U.S. Cl.
CPC ........... *H04N 5/23299* (2018.08); *G06T 7/62* (2017.01); *G06T 7/70* (2017.01); *G06T 2207/30244* (2013.01)

(58) Field of Classification Search
CPC ......... H04N 5/23299; G06T 7/62; G06T 7/70; G06T 2207/30244
See application file for complete search history.

(56) References Cited

U.S. PATENT DOCUMENTS

| | | | |
|---|---|---|---|
| 2004/0233461 A1* | 11/2004 | Armstrong | ........... G01C 11/025 356/620 |
| 2007/0009135 A1* | 1/2007 | Ishiyama | .................. G06T 7/20 382/103 |
| 2013/0114861 A1 | 5/2013 | Takizawa | |

(Continued)

FOREIGN PATENT DOCUMENTS

| JP | 2013-101045 | 5/2013 |
|---|---|---|
| JP | 5465128 | 4/2014 |

(Continued)

*Primary Examiner* — Tracy Y. Li
(74) *Attorney, Agent, or Firm* — Oblon, McClelland, Maier & Neustadt, L.L.P.

(57) ABSTRACT

An information acquisition unit acquires three-dimensional environmental information from a three-dimensional environmental information storage unit. A placement region detection unit uses the three-dimensional environmental information to detect a placement region where a target object is placed. A calculation unit calculates a size of a placement region in an image including the placement region. A viewpoint position determination unit determines, among a plurality of sensor positions where a sensor photographing the image related to image data can be placed, a sensor position where the placement region is larger than the placement region in the case of using image data of another sensor position, as an optimal viewpoint position. A sensor position control unit performs control so as to move the sensor to the optimal viewpoint position, and then performs control so as to start a search for the target object.

9 Claims, 16 Drawing Sheets

(56) References Cited

U.S. PATENT DOCUMENTS

2013/0176305 A1 7/2013 Ito et al.
2019/0235511 A1* 8/2019 Tiwari ..................... G06T 7/97

FOREIGN PATENT DOCUMENTS

| JP | 2015-190818 | 11/2015 |
| JP | 2016-099257 | 5/2016 |
| JP | 2017-016359 | 1/2017 |

* cited by examiner

SENSOR CONTROL DEVICE, OBJECT SEARCH SYSTEM, OBJECT SEARCH METHOD, AND PROGRAM

CROSS REFERENCE TO RELATED APPLICATIONS

This application is based upon and claims the benefit of priority from Japanese patent application No. 2018-108599, filed on Jun. 6, 2018, the disclosure of which is incorporated herein in its entirety by reference.

BACKGROUND

The present disclosure relates to a sensor control device, an object search system, an object search method, and a program, and in particular, to a sensor control device, an object search system, an object search method, and a program for controlling a sensor that searches for an object.

There is a technique for detecting a target object, which is an object to be searched for, by operating a sensor such as a distance sensor. In such a technique, it is necessary to consider that the target object may be shielded by other objects. In relation to this technique, Japanese Unexamined Patent Application Publication No. 2017-016359 discloses an autonomous moving robot that moves while photographing a target object by setting a position, where a predetermined function such as photographing can be achieved for the target object, as a target position. The autonomous moving robot according to Japanese Unexamined Patent Application Publication No. 2017-016359 includes a route search means for setting a movement target position and calculating a movement route from a self-position to the movement target position. The route search means obtains the position where the function can be achieved for the target object based on a positional relation between a position of a partial space that is obstructive to the function, which is obtained from spatial information and attribute information that indicates whether to the partial space is obstructive to the function, and a target object position. The route search means then sets the obtained position as the movement target position.

SUMMARY

Depending on an operating environment of a sensor, there is a possibility that a relative positional relation between an obstacle and a target object may be changed by the obstacle or the target object moving. In such a case, even when a position where the target object can be detected by the sensor while another object (obstacle) is taken into consideration is set, there is a possibility that, in the set position, the target object cannot be searched for due to the obstacle after the relative positional relation has been changed. The technique disclosed in Japanese Unexamined Patent Application Publication No. 2017-016359 does not assume that the relative positional relation between the target object and the obstacle is changed. Therefore, even when an autonomous moving robot is moved to the set position, there is a possibility that the target object cannot be photographed due to change of the relative positional relation between the target object and the obstacle. Consequently, in the technique disclosed in Japanese Unexamined Patent Application Publication No. 2017-016359, there is a possibility that the target object cannot be efficiently searched for even when a positional relation between the target object and another object can be changed.

The present disclosure provides a sensor control device, an object search system, an object search method, and a program capable of efficiently searching for a target object even when a relative positional relation between a target object and another object can be changed.

A first exemplary aspect is a sensor control device configured to control a sensor searching for a target object to be searched for in a three-dimensional environment, including: a three-dimensional environmental information acquisition unit configured to acquire three-dimensional environmental information indicating each point on an object present in the three-dimensional environment; a region detection unit configured to detect a placement region where the target object is placed by using the three-dimensional environmental information; a calculation unit configured to calculate a size of the placement region in at least one image data representing an image including the placement region; a position determination unit configured to determine, among a plurality of (at least two different) sensor positions where the sensor photographing an image related to the image data can be placed, a sensor position where the placement region is larger than the placement region in the case of using image data of another sensor position, as an optimal position; and a sensor position control unit configured to perform control, when a search for the target object is made after the optimal position has been determined, so as to move the sensor to the optimal position and then start the search for the target object.

Another exemplary aspect is an object search system, including: a sensor configured to search for a target object to be searched for in a three-dimensional environment; and a sensor control device configured to control the sensor, the sensor control device including: a three-dimensional environmental information acquisition unit configured to acquire three-dimensional environmental information indicating each point on an object present in the three-dimensional environment; a region detection unit configured to detect a placement region where the target object is placed by using the three-dimensional environmental information; a calculation unit configured to calculate a size of the placement region in at least one image data representing an image including the placement region; a position determination unit configured to determine, among a plurality of (at least two different) sensor positions where the sensor photographing an image related to the image data can be placed, a sensor position where the placement region is larger than the placement region in the case of using image data of another sensor position, as an optimal position; and a sensor position control unit configured to perform control, when a search for the target object is made after the optimal position has been determined, so as to move the sensor to the optimal position and then start the search for the target object.

Further, another exemplary aspect is an object search method for searching for a target object to be searched for in a three-dimensional environment, including: acquiring three-dimensional environmental information indicating each point on an object present in the three-dimensional environment; detecting a placement region where the target object is placed by using the three-dimensional environmental information; calculating a size of the placement region in at least one image data representing an image including the placement region; determining, among a plurality of (at least two different) sensor positions where the sensor photographing an image related to the image data can be placed, a sensor position where the placement region is larger than the placement region in the case of using image data of another sensor position, as an optimal position; and controlling the sensor, when a search for the target object is made after the optimal position has been determined, so as to move the sensor to the optimal position and then start the search for the target object.

Further, another exemplary aspect is a program for performing an object search method in which a target object to be searched for is searched for in a three-dimensional environment, the program being adapted to cause a computer to perform: acquiring three-dimensional environmental information indicating each point on an object present in the three-dimensional environment; detecting a placement region where the target object is placed by using the three-dimensional environmental information; calculating a size of the placement region in at least one image data representing an image including the placement region; determining, among a plurality of (at least two different) sensor positions where the sensor photographing an image related to the image data can be placed, a sensor position where the placement region is larger than the placement region in the case of using image data of another sensor position, as an optimal position; and controlling the sensor, when a search for the target object is made after the optimal position has been determined, so as to move the sensor to the optimal position and then start the search for the target object.

In the present disclosure, a sensor position, where an image having a larger sized placement region where a target object is placed can be photographed, is determined to be an optimal position. Further, by moving the sensor to this optimal position to start a search for the target object when a next search for the target object is made, a possibility that the target object can be recognized becomes high even when the relative positional relation between the target object and a non-target object is changed. Accordingly, even when a relative positional relation between a target object and another object can be changed, it is possible to search for the target object efficiently.

Further, it is preferred that the calculation unit calculate a size of the placement region in two or more of the image data indicating an image including the placement region, and that the position determination unit determine, among the two or more of the image data, the sensor position where an image related to the image data having the largest size of the placement region can be photographed as the optimal position.

By being configured as described above, the present disclosure can make it possible to more accurately determine an optimal position where a target object can be efficiently searched for.

Further, it is preferred that the sensor control device further include an image extraction unit configured to extract an image including the placement region, that the calculation unit calculate a size of the placement region in all the image data that can be extracted by the image extraction unit, the image data representing the image including the placement region, and that the position determination unit determine, among all the image data, the sensor position where an image related to the image data having the largest size of the placement region can be photographed as the optimal position.

By being configured as described above, the present disclosure can make it possible to further accurately determine an optimal position where a target object can be efficiently searched for.

Further, the position determination unit preferably determines, as the optimal position, the sensor position where an image related to the image data in which a size of the placement region is a predetermined threshold value or greater can be photographed.

By being configured as described above, the present disclosure can make it possible, when a size of the placement region in an image falls within an allowable range in determining an optimal position, to end the process without performing it on another image. Accordingly, the optimal position can be determined quickly.

Further, the placement region preferably corresponds to a plane where the target object is placed.

By being configured as described above, the present disclosure makes it possible to reduce a calculation amount in the position determination unit. Accordingly, a time required for determining an optimal position can be reduced.

Further, the placement region preferably corresponds to a space region where the target object is placed.

By being configured as described above, the present disclosure makes it possible to provide a placement region in which a height of a target object is taken into consideration. Accordingly, it is possible to more accurately determine an optimal position where a target object can be efficiently searched for.

According to the present disclosure, it is possible to provide a sensor control device, an object search system, an object search method, and a program capable of efficiently searching for a target object even when a relative positional relation between a target object and another object can be changed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Embodiments according to the present disclosure are described hereinafter with reference to the drawings. Note that the same symbols are assigned to substantially the same components.

Figure 1:
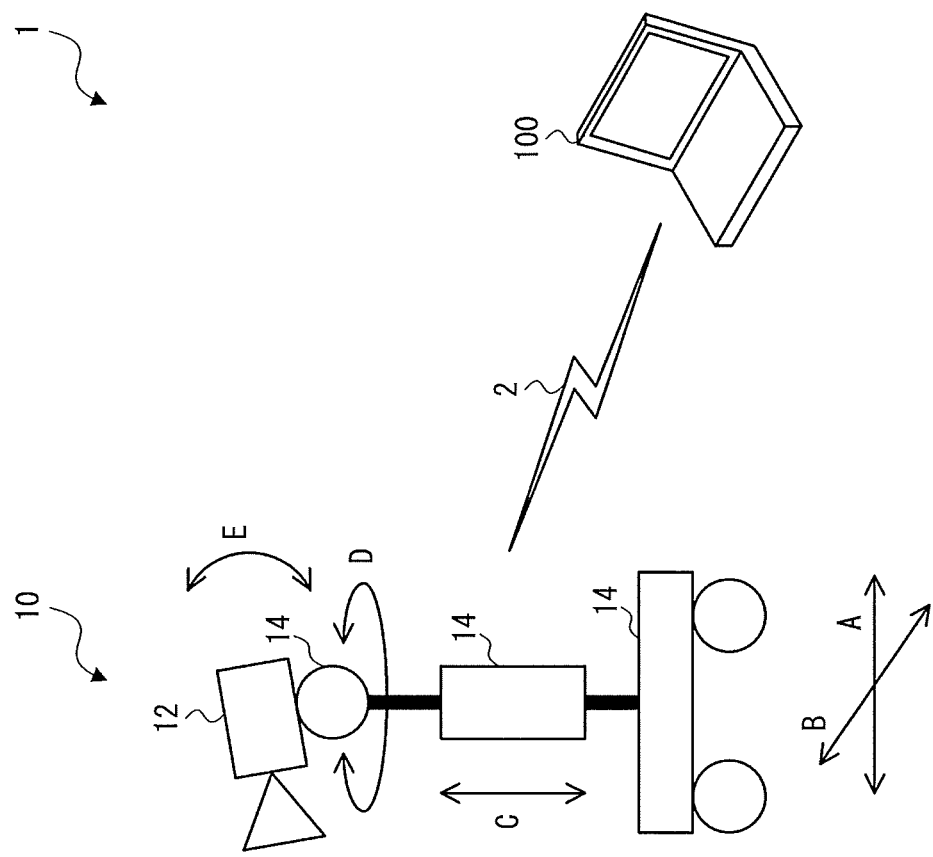
FIG. 1 shows an object search system according to a first embodiment.
Figure 1:
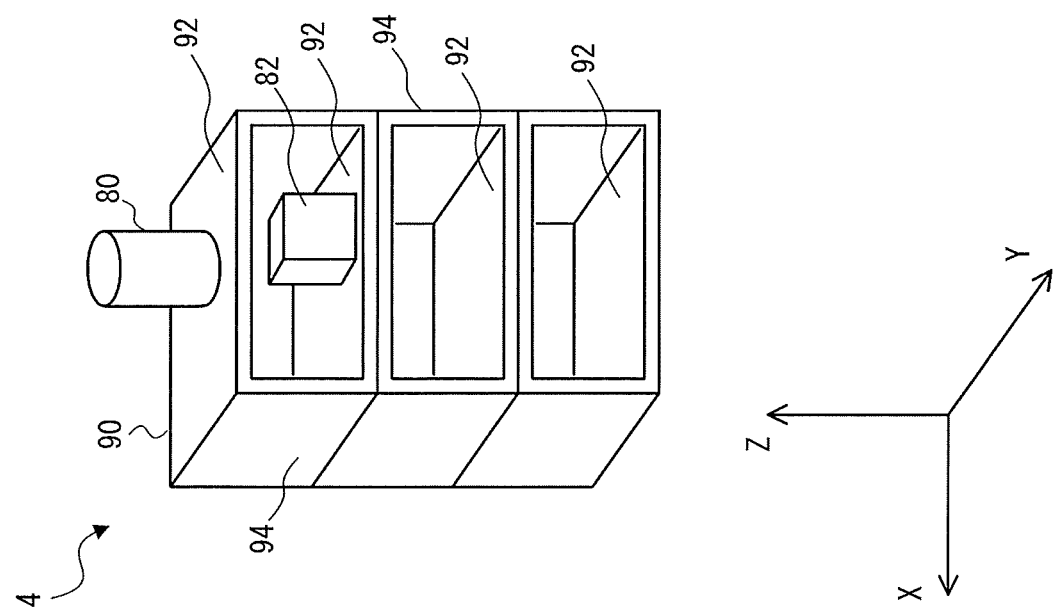
Figure 2:
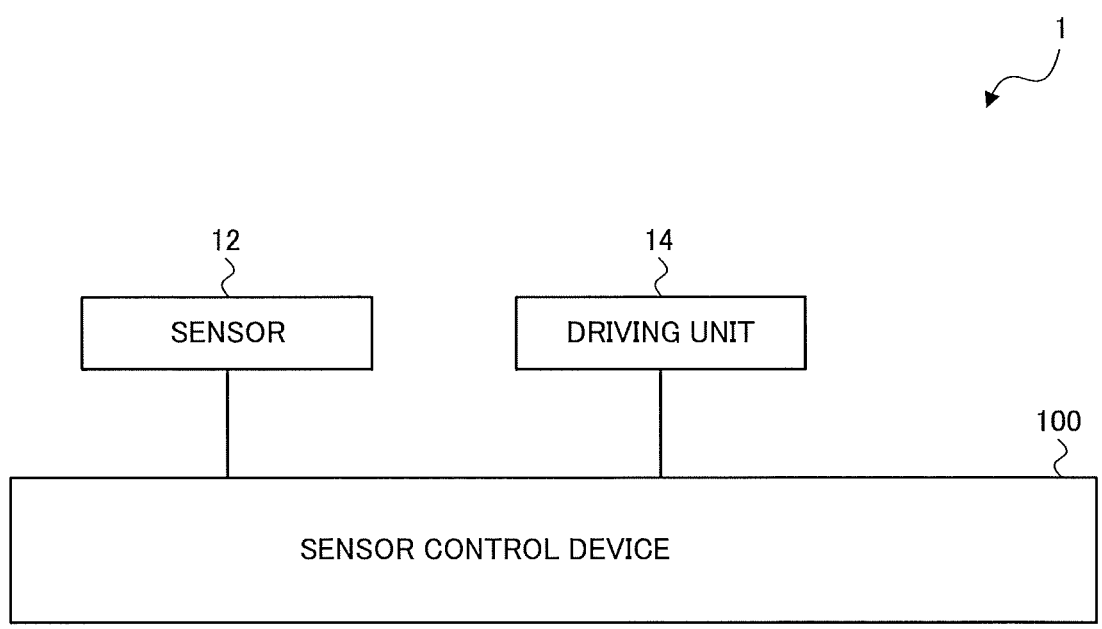
FIG. 2 is a block diagram showing a hardware configuration of the object search system according to the first embodiment.

FIG. 1 shows an object search system 1 according to a first embodiment. Further, FIG. 2 is a block diagram showing a hardware configuration of the object search system 1 according to the first embodiment. The object search system 1 includes an object search device 10 and a sensor control device 100. The object search device 10 includes a sensor 12 and a driving unit 14 that drives the sensor 12.

The sensor control device 100 is, for example, a computer. The sensor control device 100 is connected to the object search device 10 through a wired or wireless communication link 2 so that they can communicate with each other. Therefore, the sensor control device 100 is connected to the sensor 12 and the driving unit 14 so that they can communicate with each other.

Note that in FIG. 1, the sensor control device 100 and the object search device 10 are shown as physically separate devices. However, the sensor control device 100 may be incorporated into the object search device 10. Further, at least one component of the sensor control device 100 (which will be described later) may be incorporated into the object search device 10. In such a case, the object search device 10 also has functions as a computer.

The object search device 10 moves in a three-dimensional environment 4. The object search device 10 can autonomously move in the three-dimensional environment 4. Note that the three-dimensional environment 4 may be expressed by an orthogonal coordinate system or may be expressed by a polar coordinate system. In the following descriptions, an example in which the three-dimensional environment 4 is expressed by an (X, Y, Z)-orthogonal coordinate system is shown.

The sensor 12 is a measurement device capable of measuring a distance to an object, such as a depth sensor, a distance censor, or a three-dimensional camera (a stereo camera). The sensor 12 is, for example, a lidar (LIDAR: Light Detection and Ranging) or the like. The object search device 10 (the sensor 12) has five degrees of freedom by the driving unit 14 as described below.

As indicated by an arrow A, the driving unit 14 moves the object search device 10 (the sensor 12) in an X-axis direction of the three-dimensional environment 4. Further, as indicated by an arrow B, the driving unit 14 moves the object search device 10 (the sensor 12) in a Y-axis direction of the three-dimensional environment 4. Further, as indicted by an arrow C, the driving unit 14 moves the sensor 12 in a Z-axis direction of the three-dimensional environment 4 (i.e., in a vertical direction). Further, as indicated by an arrow D, the driving unit 14 rotates (turns) the sensor 12 in parallel to an XY-plane of the three-dimensional environment 4 (i.e., in a horizontal direction). Further, as indicted by an arrow E, the driving unit 14 rotates (swings) the sensor 12 in an up/down direction of the three-dimensional environment 4. That is, as indicated by the arrows A, B and C, the sensor 12 is moved by the driving unit 14 so that its three-dimensional position coordinates in the three-dimensional environment 4 changes. Further, as indicated by the arrows D and E, the sensor 12 is moved by the driving unit 14 so that its posture (its orientation) in the three-dimensional environment 4 changes. In the following descriptions, the "movement" of the sensor 12 includes a change in the three-dimensional position coordinates and a change in the posture. Further, the "position" of the sensor 12 includes its three-dimensional position coordinates and its posture.

The sensor 12 observes surroundings of the object search device 10 and measures a distance from the sensor 12 (the object detection apparatus 10) to each point on the observed object. Then, the sensor 12 generates distance data indicating the measured distance. The sensor 12 generates distance image data indicating a distance image (a point cloud) as the distance data. That is, the distance data represents a group of points (hereinafter also referred to as a point group) on the surface of each object present around the sensor 12 (the object search device 10) in three dimensions. The sensor 12 scans its surroundings with laser light and receives reflected light reflected by an object to calculate a distance to the object from, for example, a difference between a transmission time and a reception time of the reflected light. Then, the object search device 10 (the sensor 12) calculates three-dimensional coordinates (x, y, z) of a point at which the laser light is reflected based on three-dimensional position coordinates of the sensor 12 in the three-dimensional environment 4, an emitting direction of the laser light, and the distance to the object.

A target objects 80 to be searched for by the object search device 10 and a non-target object 82 different from the target object 80 are placed in the three-dimensional environment 4. Note that the non-target object 82 may be a target to be searched for. In such a case, the non-target object 82 can be a target object and the target object 80 can be a non-target object.

Further, at least one storage object 90 is provided in the three-dimensional environment 4. The storage object 90 includes at least one shelf board 92 and a wall surface(s) 94. The storage object 90 houses the target objects 80 and the non-target object 82. In this embodiment, the target objects 80 and the non-target object 82 are placed on the shelf board 92 of the storage object 90. Note that in this embodiment, the target object 80 and the non-target object 82 are placed so that they can move to the storage object 90. That is, the target object 80 and the non-target object 82 are not always placed at a predetermined position in the shelf board 92.

Figure 3:
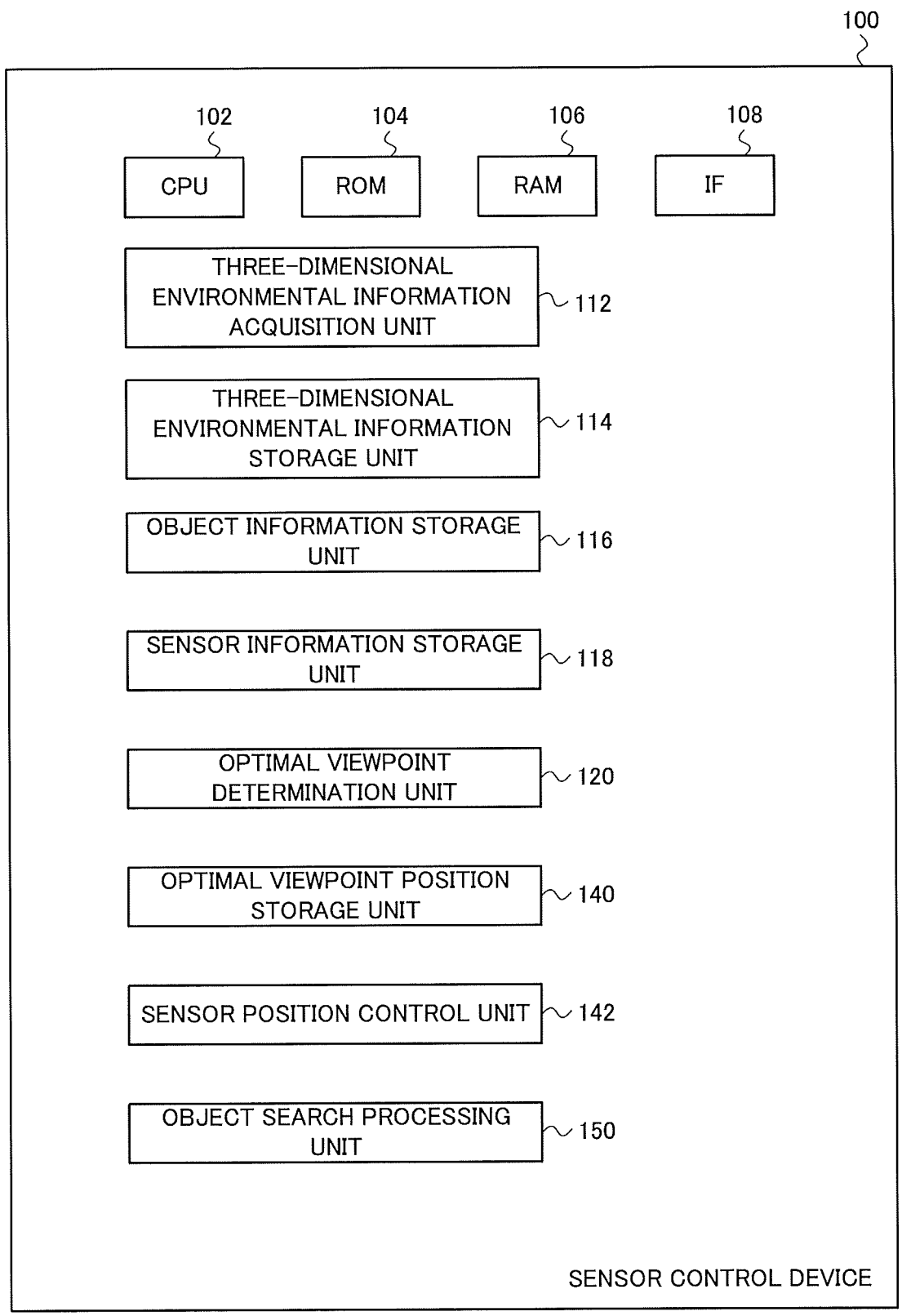
FIG. 3 is a block diagram showing a configuration of a sensor control device according to the first embodiment.

FIG. 3 is a block diagram showing a configuration of the sensor control device 100 according to the first embodiment. The sensor control apparatus 100 includes, as a main hardware configuration, a CPU (Central Processing Unit) 102, a ROM (Read Only Memory) 104, a RAM (Random Access Memory) 106, and an interface unit 108 (IF; Interface). The CPU 102, the ROM 104, the RAM 106, and the interface unit 108 are connected to each other through a data bus or the like.

The CPU 102 has functions as an arithmetic apparatus that performs control processes, arithmetic processes, etc. The ROM 104 has a function of storing a control program(s), an arithmetic program(s), etc. that are executed by the CPU 102. The RAM 106 has a function of temporarily storing processing data and the like. The interface unit 108 externally receives/outputs signals wirelessly or through a wire. Further, the interface unit 108 receives a data input operation performed by a user and displays information for the user.

Further, the sensor control apparatus 100 includes a three-dimensional environmental information acquisition unit 112, a three-dimensional environmental information storage unit 114, an object information storage unit 116, a sensor information storage unit 118, an optimal viewpoint determination unit 120, an optimal viewpoint position storage unit 140, a sensor position control unit 142, and an object search processing unit 150 (hereinafter, also referred to as "each component"). Each component can be implemented by, for example, having the CPU 102 execute a program(s) stored in the ROM 104. Further, necessary programs may be stored in an arbitrary nonvolatile recording medium in advance, and may be installed as required. Note that the implementation of each component is not limited to the above-described software implementation and may be implemented by hardware such as some type of circuit devices. Further, at least one of the aforementioned components may be implemented by physically-separate individual hardware. Specific functions of each component will be described later.

Figure 4:
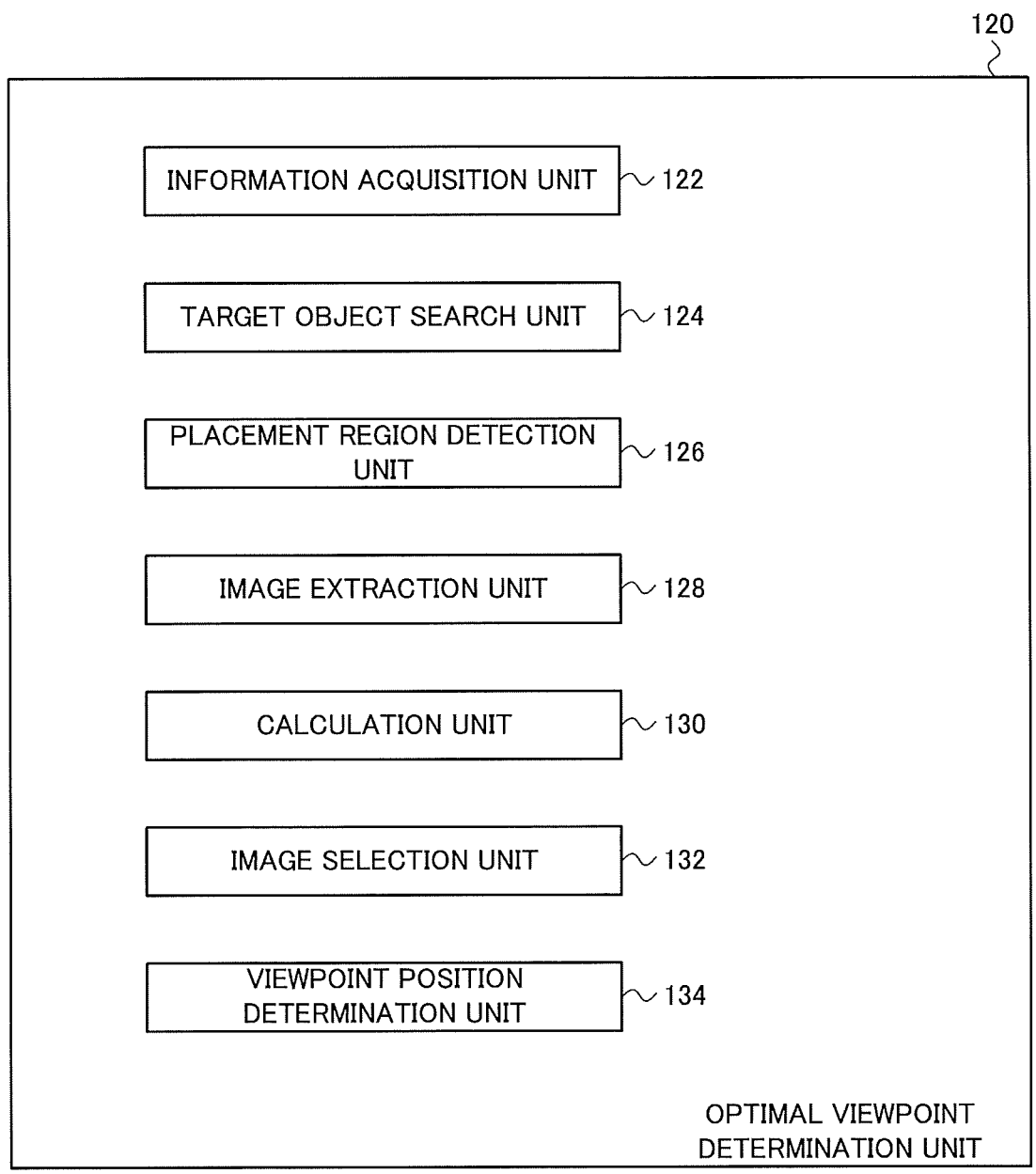
FIG. 4 is a block diagram showing a configuration of an optimal viewpoint determination unit according to the first embodiment.

FIG. 4 is a block diagram showing a configuration of the optimal viewpoint determination unit 120 according to the first embodiment. The optimal viewpoint determination unit 120 includes an information acquisition unit 122, a target object search unit 124, a placement region detection unit 126, an image extraction unit 128, a calculation unit 130, an image selection unit 132, and a viewpoint position determination unit 134. Functions of each component of the optimal viewpoint determination unit 120 will be described later.

Figure 5:
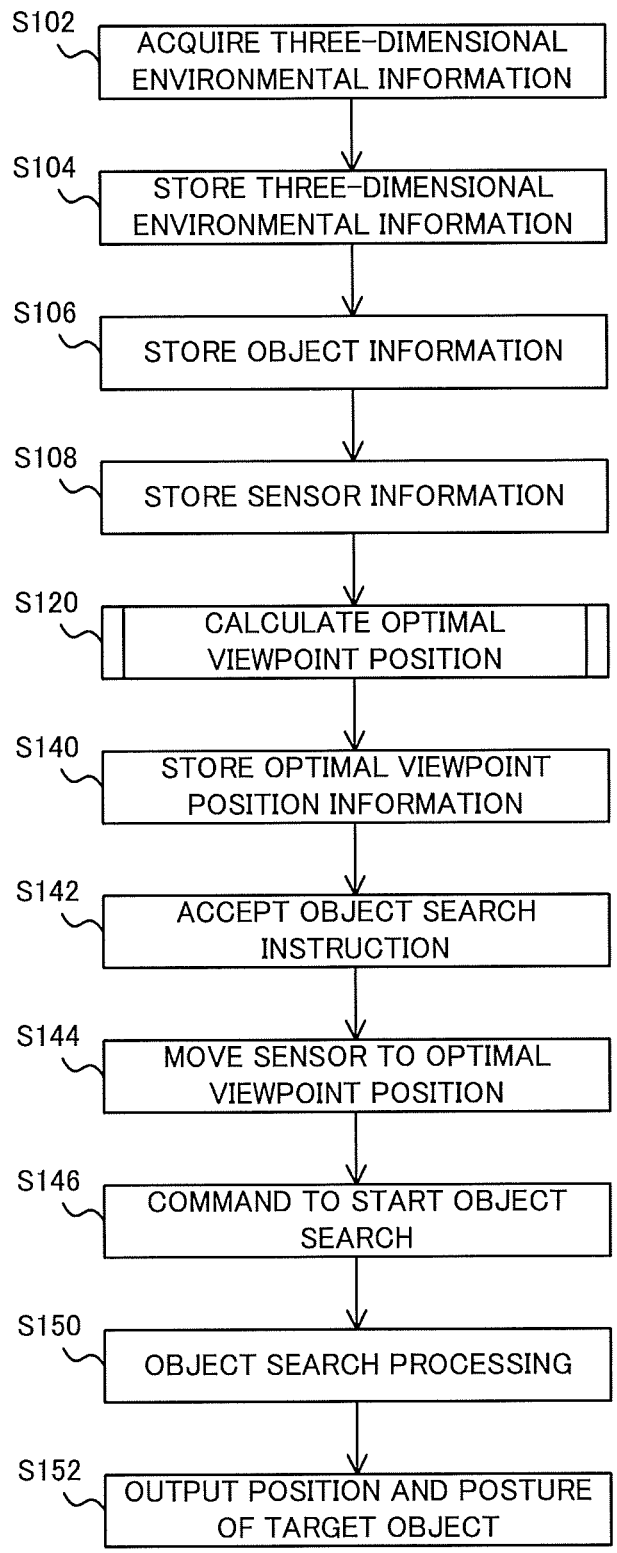
FIG. 5 is a flowchart showing an object search method performed by the sensor control device according to the first embodiment.

FIG. 5 is a flowchart showing an object search method performed by the sensor control device 100 according to the first embodiment. The three-dimensional environmental information acquisition unit 112 acquires three-dimensional environmental information (a three-dimensional environmental map) indicating the three-dimensional environment 4 (Step S102). The three-dimensional environmental information storage unit 114 stores the acquired three-dimensional environmental information (Step S104).

The three-dimensional environmental information is information indicating three-dimensional coordinate data of each point (in a point group) on each object present in the three-dimensional environment 4. When there are a plurality of three-dimensional environments 4, the three-dimensional environmental information storage unit 114 can store a plurality of three-dimensional environmental information pieces. For example, three-dimensional environmental information can be generated and stored for each environment such as an environment of a house, an environment of a shop, an environment of a tenant (i.e., a rental room), and an environment of a floor.

The three-dimensional environmental information indicates, for example, whether or not there is any object at a given point represented by three-dimensional coordinates (X, Y, Z). Therefore, the sensor control device 100 and the object search device 10 can recognize a shape of an object by detecting that there is any object in consecutive three-dimensional coordinates in the three-dimensional environmental information. Note that they may be capable of recognizing that there is any object at a position corresponding to three-dimensional coordinates by using the three-dimensional environmental information, and may not be capable of recognizing what the object is (for example, recognizing whether it is the target object 80 or the storage object 90).

The three-dimensional environmental information is acquired by, for example, having the sensor 12 scan the entire space of the three-dimensional environment 4 and calculate three-dimensional coordinates of each point on each object. That is, the three-dimensional environmental information can be generated by using the sensor 12. Note that a distance sensor different from the sensor 12 may be used to generate three-dimensional environmental information. In this case, the three-dimensional environmental information acquisition unit 112 may acquire the three-dimensional environmental information from the distance sensor. In such a manner, the three-dimensional environmental information acquisition unit 112 can provide the three-dimensional environmental information to the three-dimensional environmental information storage unit 114.

The object information storage unit 116 stores object information (Step S106). For example, the object information storage unit 116 stores object information input to the interface unit 108 by a user. Note that object information may be stored in the sensor control device 100 in advance. Here, the "object information" is information, among information on objects which the object search device 10 can handle, necessary to search for the objects. For example, the object information indicates a shape and a size of an object which can be the target object 80. For example, the object information may be CAD (computer-aided design) data of the object. Note that the target object information may not include position information such as information indicating where the corresponding object is placed.

The sensor information storage unit 118 stores sensor information (Step S108). For example, the sensor information storage unit 118 stores sensor information input to the interface unit 108 by a user. Note that sensor information may be stored in the sensor control unit 100 in advance. Here, the "sensor information" is information related to measurement performed by the sensor 12. For example, the sensor information indicates an angle of view, a focal length, a resolution, number of pixels, and the like of the sensor 12. That is, the sensor information may indicate a measurable range of the sensor 12. In this way, a size, a resolution, and the like of three-dimensional image data (distance image data) generated by the sensor 12 can be specified.

The optimal viewpoint determination unit 120 calculates a viewpoint position optimal for searching for the target object 80 (Step S120). Specifically, the optimal viewpoint determination unit 120 searches for the target object 80 based on three-dimensional environmental information. Then, the optimal viewpoint determination unit 120 calculates a viewpoint (optimal viewpoint position) which is optimal as a first viewpoint when a search for the searched target object 80 is made again. More specific processes performed by the optimal viewpoint determination unit 120 are described below.

Figure 6:
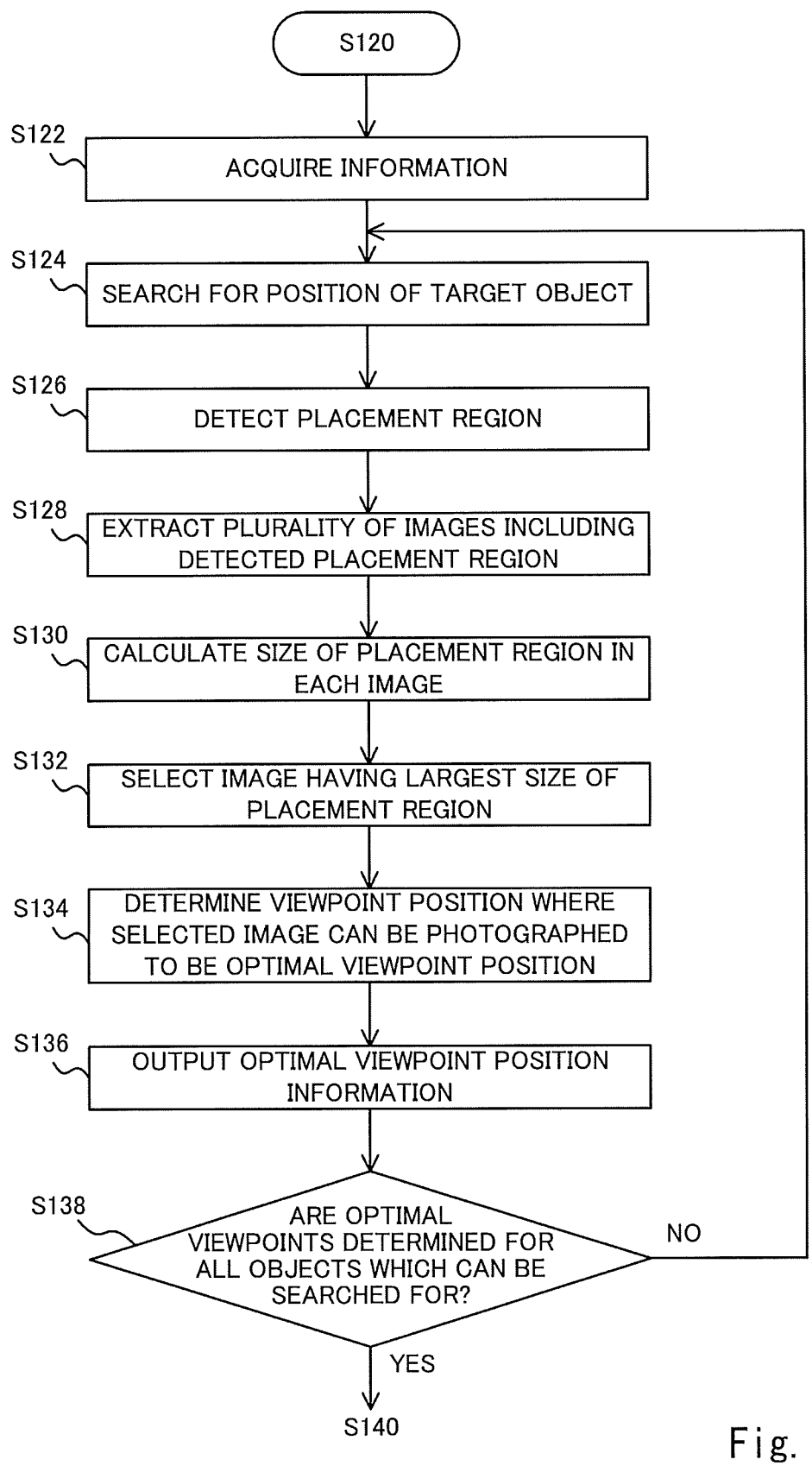
FIG. 6 is a flowchart showing processes performed by the optimal viewpoint determination unit according to the first embodiment.

FIG. 6 is a flowchart showing processes (S120) performed by the optimal viewpoint determination unit 120 according to the first embodiment. The information acquisition unit 122 acquires various information items necessary to determine an optimal viewpoint position (Step S122). Specifically, the information acquisition unit 122 acquires three-dimensional environmental information from the three-dimensional environmental information storage unit 114. Further, the information acquisition unit 122 acquires object information from the object information storage unit 116. Further, the information acquisition unit 122 acquires sensor information from the sensor information storage unit 118.

The target object search unit 124 searches for a position of the target object 80 (Step S124). Specifically, the target object search unit 124 uses three-dimensional environmental information, and object information indicating the target object 80 to search for a position of the target object 80. For example, the target object search unit 124 calculates a difference between information indicating shapes of objects present in a three-dimensional environmental map represented by the three-dimensional environmental information and object information (CAD data or the like) indicating the shape of the target object 80, for each object present in the three-dimensional environmental map. Then, the target object search unit 124 determines that an object for which the calculated difference is smaller than a predetermined threshold value as the target object 80 among the objects present in the three-dimensional environmental map. Further, the target object search unit 124 determines that the target object 80 is present at a position of the determined object present in the three-dimensional environmental map. In such a manner, the target object search unit 124 searches for a position where the target object 80 is placed.

The placement region detection unit 126 uses the three-dimensional environmental information to detect, for the target object 80 of which the position is confirmed, a placement region where the target object 80 is placed (Step S126). Note that the "placement region" is a plane or a space where the target object 80 is placed. For example, when a placement region is a plane, the placement region is defined as a surface (placement surface) of the shelf board 92 where the target object 80 is placed. Further, for example, when a placement region is a space, the placement region is defined as a virtual columnar space (placement space) in which the bottom surface thereof is the surface of the shelf board 92 where the target object 80 is placed and the height thereof is the height of the target object 80.

A specific example of a method for detecting a placement region is described. The placement region detection unit 126 uses object information to recognize the bottom surface of the searched target object 80 in the three-dimensional environmental map. Note that the object information includes bottom surface information such as a position occupied by the bottom surface of the target object 80. The placement region detection unit 126 specifies, in the three-dimensional environmental map, a surface where the searched target object 80 is placed, that is, a surface (contact surface) in contact with the bottom surface. The placement region detection unit 126 determines that a surface belonging to the same category as that of the contact surface is a placement surface which is a placement region.

For example, the placement region detection unit 126 sets a surface continuous with the contact surface as the surface belonging to the same category as that of the contact surface, that is, the placement surface. The placement region detection unit 126 detects edges (boundaries) of a plane including the contact surface to detect a region inside the edges as the placement surface. For example, in the storage object 90 shown in FIG. 1, when the target object 80 is placed on the shelf board 92, in the three-dimensional environmental map, the edges surrounding the image of the shelf board 92 where the target object 80 is placed are detected, thereby specifying the placement surface.

Further, when the placement region is a space, in a virtual three-dimensional space, the placement region detection unit 126 detects, as a placement space, a space defined as a trajectory when the specified placement surface is imaginarily moved vertically upward (in a Z-axis positive direction) by a distance corresponding to the height of the target object 80. Note that information indicating the height of the target object 80 is included in the object information related to the target object 80. For the target object 80 having a height which differs according to how it is oriented when it is placed, like a rectangular parallelepiped, the placement region detection unit 126 may detect, as a placement space, a space defined as a trajectory when the specified placement surface is imaginarily moved vertically upward by a distance corresponding to the highest height (or the lowest height) of the target object 80 according to how it is placed.

Further, in the case where the trajectory when the placement surface is moved imaginarily and the storage object 90 collide with each other, a region corresponding to the storage object 90 can be removed from the placement space. Note that the placement region detection unit 126 does not take the non-target object 82 into consideration when detecting the placement region. That is, even when the non-target object 82 is placed in the same placement region as that of the target object 80 is, the process is performed assuming that there is no non-target object 82 when the placement region is detected. Therefore, even when the trajectory when the placement surface is moved imaginarily and the non-target object 82 collide with each other, a region corresponding to the non-target object 82 is not removed from the placement space. Similarly, the placement region detection unit 126 does not take the target object 80 into consideration.

The image extraction unit 128 extracts, from the three-dimensional environmental information, a plurality of image data representing an image including the placement region detected in the process of S126 (Step S128). Specifically, the image extraction unit 128 extracts image data including a distance image including a point group of a position corresponding to the placement region, the distance image being viewed from a plurality of viewpoints. Note that, in the following descriptions, the term "image" also means "image data representing an image" as data to be processed in information processing.

The image extraction unit 128 generates a distance image that is obtained when the placement region is viewed from a plurality of sensor positions (viewpoints) where the sensor 12 can be placed in the three-dimensional environmental map. For example, the image extraction unit 128 may generate a distance image that is obtained when the placement region is viewed from an imaginarily-defined viewpoint to extract the distance image including the placement region in the three-dimensional environmental map, that is, in the three-dimensional virtual space. Further, the image extraction unit 128 may extract a distance image including the placement region among the distance images which are actually photographed from a plurality of viewpoints by the sensor 12 or the like when three-dimensional environmental information is generated. In this case, the image extraction unit 128 may extract a distance image including the placement region along the trajectory of the sensor 12 when the three-dimensional environmental information is generated. In this case, when extracting one distance image including the placement region, the image extraction unit 128 may next extract a distance image photographed before and after the time at which the extracted distance image is photographed. Alternatively, when extracting one distance image including the placement region, the image extraction unit 128 may next extract a distance image photographed near the position at which the extracted distance image is photographed. This is because there is an extremely high possibility that the distance image photographed before and after the time at which the distance image including the placement region is photographed, or the distance image photographed near the position at which the distance image including the placement region is photographed, includes the placement region. By performing such a process, it is possible to more easily and efficiently extract the distance image including the placement region.

Figure 7:
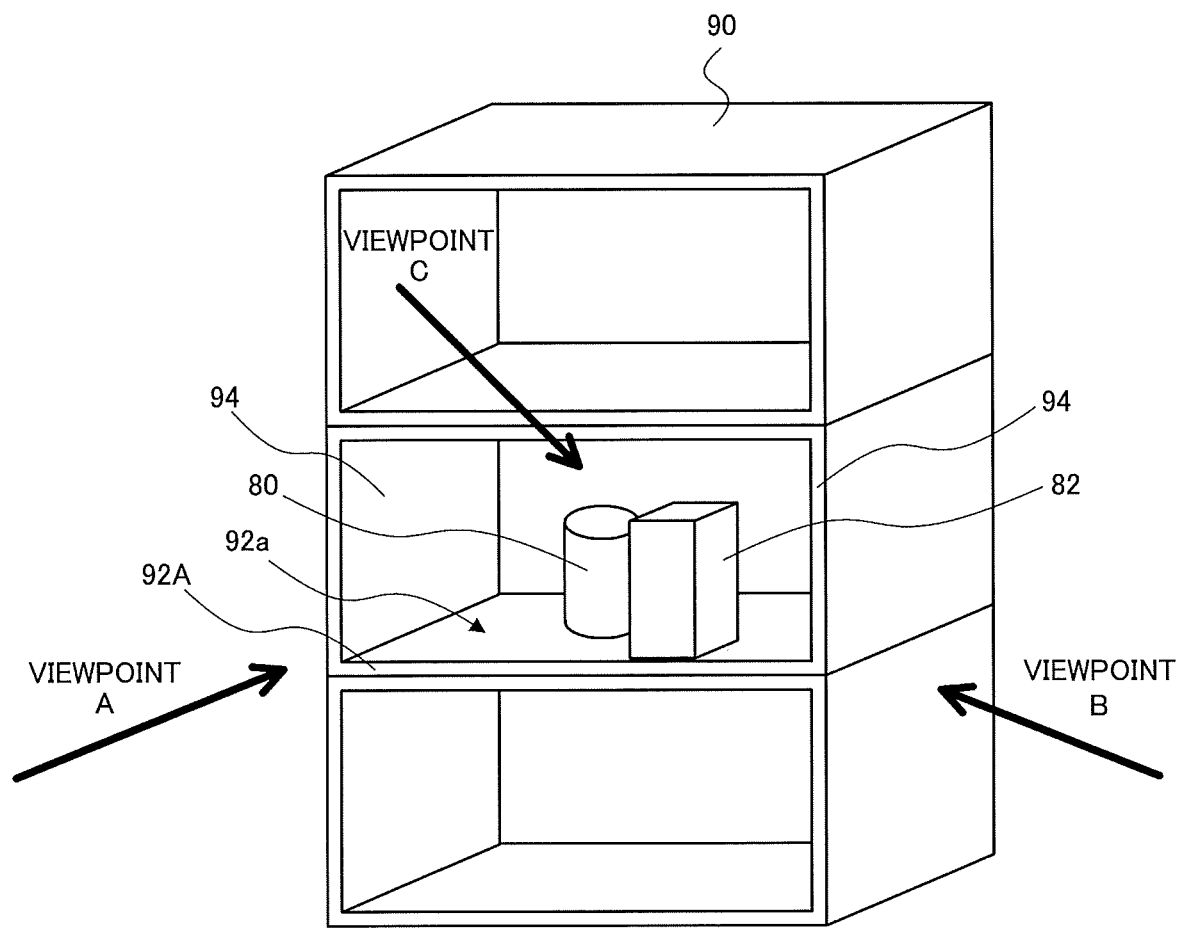
FIG. 7 is a diagram showing an example of a plurality of viewpoints according to the first embodiment.

FIG. 7 is a diagram showing an example of a plurality of viewpoints according to the first embodiment. FIG. 7 shows a state in which the target object 80 and the non-target object 82 are placed on the shelf board 92A of the storage object 90. In this case, a surface 92a, in contact with the target object 80, of the shelf board 92A is a placement region (placement surface). Further, in this case, the image extraction unit 128 extracts distance images including the image of the surface 92a which are viewed from viewpoints A to C as a plurality of sensor positions (viewpoints) where the sensor 12 can be placed. Note that the viewpoint A is a viewpoint position where the target object 80 (surface 92a) is viewed from the left. The viewpoint B is a viewpoint position where the target object 80 (surface 92a) is viewed from the right. The viewpoint C is a viewpoint position where the target object 80 (surface 92a) is viewed from substantially the front. Note that although there are three viewpoint positions in the example shown in FIG. 7, two or more viewpoints may be set. Here, the "viewpoint position (viewpoint)" indicates a position and an orientation of a subject (for example, human eyes or the sensor 12) performing an operation of viewing (photographing) an object. Note that, as described above, the process of S128 can be a process on the virtual space, and thus it is not necessary to actually view (photograph) an object from the view.

The calculation unit 130 calculates a size of the placement region in each image extracted in the process of S128 (Step S130). Then, the image selection unit 132 selects an image (image data) having the largest size of the placement region (Step S132). Specifically, the calculation unit 130 calculates, for each of the extracted images, a size of the placement region in the distance image. The image selection unit 132 selects an image having the largest size of the placement region in the distance image. That is, the image selection unit 132 selects an image corresponding to a viewpoint where the largest size of the placement region appears in the image. Note that specific examples of processes performed by the calculation unit 130 and the image selection unit 132 will be described later.

The viewpoint position determination unit 134 determines, as an optimal viewpoint position for a first viewpoint when a next search for the target object 80 is made, a viewpoint position where the image selected in the process of S132 can be photographed (Step S134). The viewpoint position determination unit 134 outputs optimal viewpoint position information indicating optimal viewpoint positions (Step S136). The optimal viewpoint determination unit 120 determines whether or not optimal viewpoints have been determined for all the objects (target objects 80) which can be searched for (Step S138). When optimal viewpoints for all the objects (target objects 80) are not determined (NO in S138), the optimal viewpoint determination unit 120 performs the processes from S124 to S136 on the objects for which the optimal viewpoints are not determined. When optimal viewpoints for all the objects (target objects 80) are determined (YES in S138), the optimal viewpoint determination unit 120 ends the processes of S120 shown in FIG. 6.

The optimal viewpoint position storage unit 140 stores the optimal viewpoint position information output from the optimal viewpoint determination unit 120 (Step S140 shown in FIG. 5). The optimal viewpoint position information indicates three-dimensional coordinates and an orientation (an angle) of the optimal viewpoint position in the three-dimensional environment. Note that the optimal viewpoint position storage unit 140 stores the optimal viewpoint position information corresponding to each of the objects (target objects 80).

The sensor position control unit 142 accepts (i.e., receives) an object search instruction which is a command for searching for a target object 80 after the optimal viewpoint position has been determined (Step S142). The object search instruction can be input by a user operating the interface unit 108, for example. The object search instruction indicates object information indicating the target object 80 to be searched for. Note that the target object 80 or the non-target object 82 can be moved between the processes of S140 and S142. In other words, after the process of S140, a relative positional relation between the target object 80 and the non-target object 82 can be changed.

The sensor position control unit 142 performs control so as to move the sensor 12 to the optimal viewpoint position corresponding to the target object 80 indicated by the object search instruction (Step S144). Specifically, the sensor position control unit 142 extracts the optimal viewpoint position information corresponding to the target object 80 indicated by the object search instruction from the optimal viewpoint position storage unit 140. Then, the sensor position control unit 142 controls the driving unit 14 to move the sensor 12 to the viewpoint position indicated by the extracted optimal viewpoint position information.

The sensor position control unit 142 outputs a command to start an object search to the object search processing unit 150 after the sensor 12 has been moved to the optimal viewpoint position (Step S146). When the object search processing unit 150 accepts the command to start the object search, it starts search processing of the target object 80 (Step S150). For example, the object search processing unit 150 controls the sensor 12 to generate a distance image. The sensor 12 scans laser light or the like at the current viewpoint position (optimal viewpoint position) to generate a distance image. The object search processing unit 150 calculates, for each object, a difference between information indicating the shape of each of the objects in the distance image and object information (CAD data or the like) indicating the shape of the target object 80. Then, the object search processing unit 150 recognizes that an object for which the calculated difference is the smallest (or an object for which the calculated difference is smaller than a predetermined threshold value) is the target object 80. Then, when the object search processing unit 150 has searched for the target object 80, it outputs information indicating a position and a posture of the searched target object 80 in the three-dimensional environment 4 (Step S152).

Figure 8:
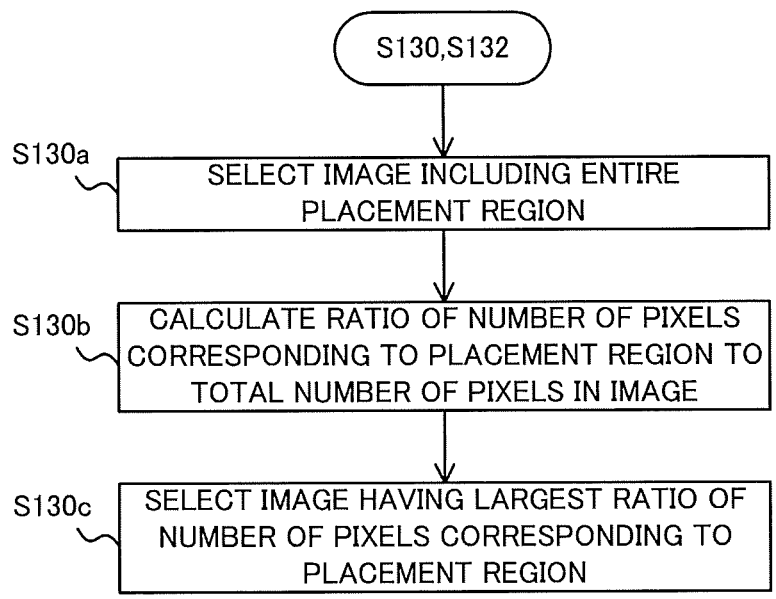
FIG. 8 is a flowchart showing a specific example of processes performed by a calculation unit and an image selection unit according to the first embodiment.

FIG. 8 is a flowchart showing a specific example of processes performed by the calculation unit 130 and the image selection unit 132 according to the first embodiment. The calculation unit 130 selects an image including the entire placement region among the images extracted in the process of S128 (Step S130a). For example, when the entire placement region is not included in the distance image since the viewpoint position is too close to the placement region, that is, when a part of the placement region protrudes from the distance image, that distance image is not selected. In other words, when the outer edge of the distance image and the placement region intersect each other, that distance image is not selected. Therefore, the distance image in which the placement region falls within an angle of view of the sensor 12 is selected. That is, when a part of the placement region does not protrude from the distance image, in other words, when the outer edge of the distance image and the placement region do not intersect each other, that distance image is selected. As a result, the distance image, in which a position apart from the placement region by such a degree that the entire placement region is included is used as a viewpoint position, can be selected. Note that the same applies to the other embodiments which will be described later.

Next, the calculation unit 130 calculates, for each of the images selected in the process of S130a, a ratio of the number of pixels corresponding to the placement region to the total number of pixels in the image (Step S130b). Note that the total number of pixels is included in the sensor information acquired in the process of S122. Further, the number of pixels corresponding to the placement region is the number of points (pixels) constituting the placement region in the distance image. Then, the image selection unit 132 selects the distance image having the largest ratio of the number of pixels corresponding to the placement region (Step S130c).

Note that the calculation unit 130 calculates a size of the placement region assuming that there is no target object 80. Further, even when the non-target object 82 is included in the distance image, the calculation unit 130 calculates a size of the placement region assuming that there is no non-target object 82. That is, the calculation unit 130 calculates a size of the placement region assuming that there are no target object 80 and no non-target object 82 which can be moved. Therefore, the calculation unit 130 calculates the number of pixels corresponding to the placement region in the case where images of the target object 80 and the non-target object 82 included in the distance image are removed therefrom.

For example, the calculation unit 130 removes images of the target object 80 and the non-target object 82 from the distance image. When the boundary of the placement region overlaps with images of the target object 80 and the non-target object 82, a lack of the boundary of the placement region is caused by removing the image of the target object 80 and the non-target object 82. The calculation unit 130 corrects the boundary of the placement region by continuously extending the edges of the placement region which has been visibly present from the beginning. Then, the calculation unit 130 allocates a pixel to a part (inside the boundary of the placement region) corresponding to the placement region among the parts which the images of the target object 80 and the non-target image 82 have been removed, and then calculates the number of pixels corresponding to the placement region.

On the other hand, the calculation unit 130 does not remove, from the distance image, images of the wall surfaces 94 constituting the storage object 90, and other shelf boards 92 which are not the placement region, other than the target object 80 and the non-target image 82 (that is, other than objects which can be the target object 80). Therefore, when the placement region is shielded by the wall surfaces 94 or the like in the distance image, the calculation unit 130 does not count the number of pixels in that shielded part.

The processes performed for the example shown in FIG. 7 are described below using the drawings.

Figure 9:
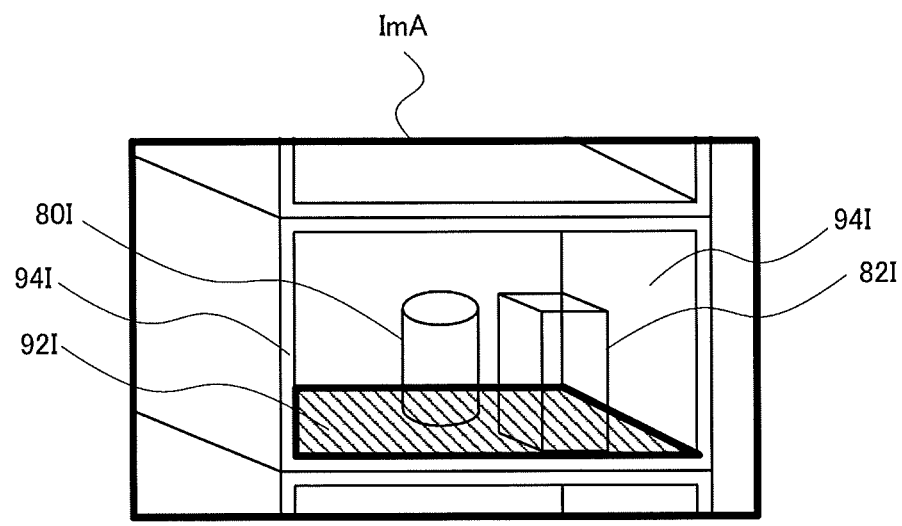
FIG. 9 is a diagram for explaining processes when a placement region is a plane regarding the example shown in FIG. 7.
Figure 10:
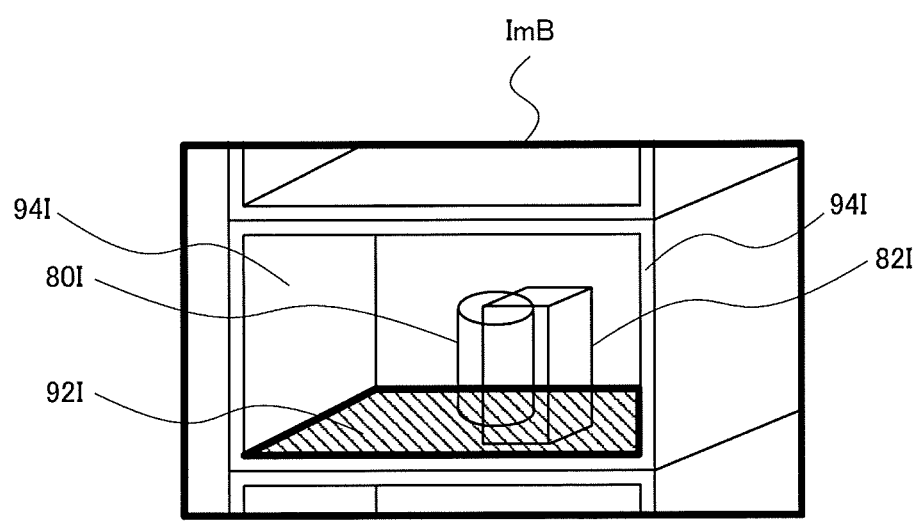
FIG. 10 is a diagram for explaining processes when a placement region is a plane regarding the example shown in FIG. 7.
Figure 11:
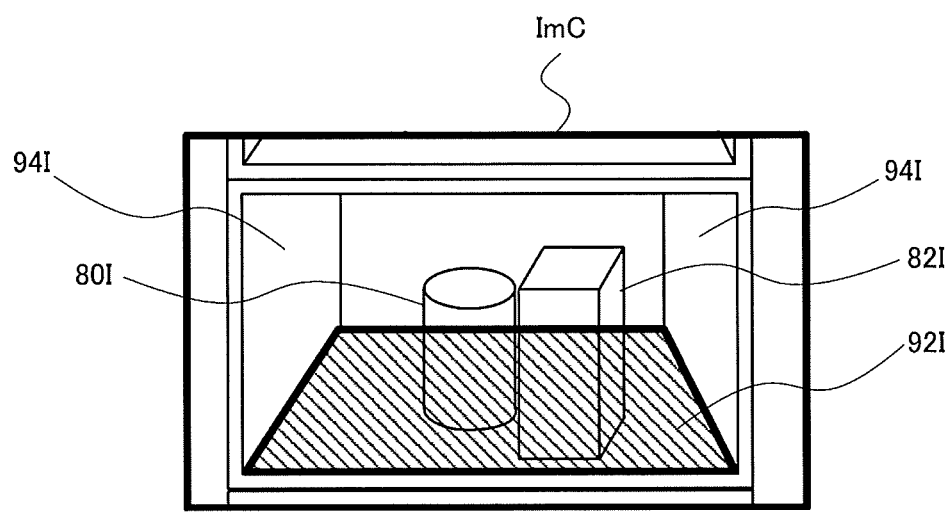
FIG. 11 is a diagram for explaining processes when a placement region is a plane regarding the example shown in FIG. 7.

FIG. 9 to FIG. 11 are diagrams for explaining the processes when the placement region is a plane (placement surface) regarding the example shown in FIG. 7. FIG. 9 shows a distance image ImA viewed from the viewpoint A. FIG. 10 shows a distance image ImB viewed from the viewpoint B. FIG. 11 shows a distance image ImC viewed from the viewpoint C.

As shown in FIG. 9, in the distance image ImA viewed from the viewpoint A, a target object image 80I which is an image of the target object 80 is separated from a non-target object image 82I which is an image of the non-target object 82 and wall surface images 94I which are images of the wall surfaces 94. Accordingly, at this stage, it is easy to recognize the target object 80 by using the distance image ImA. Further, in the distance image ImA, a part of the left side of the surface 92a of the shelf board 92A on which the target object 80 is placed is shielded by the wall surface 94. Accordingly, in the distance image ImA, a shelf board surface image 92I, which is the image of the surface 92a of the shelf board 92A on which the target object 80 is placed, reflects only a part of the surface 92a of the shelf board 92A in such a manner as to collide with the wall surface image 94I. This shelf board surface image 92I corresponds to the placement region.

As shown in FIG. 10, in the distance image ImB viewed from the viewpoint B, the target object image 80I overlaps with the non-target object image 82I. Thus, the target object image 80I does not reflect the whole target object 80. Therefore, at this stage, even if the distance image ImB is used, it is difficult to recognize the target object 80. Further, in the distance image ImB, a part of the right side of the surface 92a of the shelf board 92A on which the target object 80 is placed is shielded by the wall surface 94. Accordingly, in the distance image ImB, the shelf board surface image 92I reflects only a part of the surface 92a of the shelf board 92A in such a manner as to collide with the wall surface image 94I. This shelf board surface image 92I corresponds to the placement region.

As shown in FIG. 11, in the distance image ImC viewed from the viewpoint C, the target object image 80I is close to the non-target object image 82I. Therefore, at this stage, the target object 80 can be recognized more easily when the distance image ImA is used than when the distance image ImC is used. Further, in the distance image ImC, the surface 92a of the shelf board 92A on which the target object 80 is placed is not shielded by the right and left wall surfaces 94. Accordingly, in the distance image ImC, the shelf board surface image 92I reflects the entire surface 92a of the shelf board 92A without colliding with the wall surface images 94I. This shelf board surface image 92I corresponds to the placement region.

For each of FIGS. 9 to 11, the calculation unit 130 respectively calculates a size of the shelf board surface image 92I (hatched areas surrounded by bold lines in FIGS. 9 to 11) corresponding to the placement region on which the target object 80 is placed. Note that as described above, the calculation unit 130 calculates a size (a ratio of the number of pixels of the placement region to the entire distance image) of the placement region assuming that there are no target object 80I and no non-target object 82I. On the other hand, the calculation unit 130 calculates a size of the placement region with consideration given to presence of the wall surface images 94I. Accordingly, as indicated by bold lines in FIGS. 9 to 11, edges of the shelf board surface image 92I corresponding to the placement region are formed by the wall surface images 94I.

Note that as described above, among the distance images related to the viewpoints A to C shown in FIGS. 9 to 11, the target object 80 is easiest to recognize in the distance image ImA (FIG. 9) related to the viewpoint A. However, among the distance images related to the viewpoints A to C shown in FIGS. 9 to 11, the distance image ImC (FIG. 11) related to the viewpoint C has the largest size of the shelf board surface image 92I in the distance images. Therefore, the image selection unit 132 selects the distance image ImC shown in FIG. 11, and the viewpoint position determination unit 134 determines the viewpoint C corresponding to the distance image ImC as an optimal viewpoint position.

Figure 12:
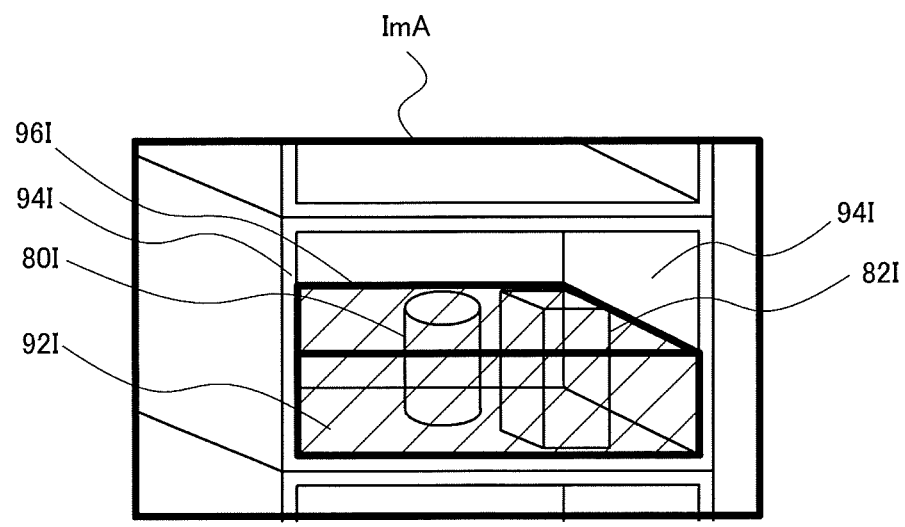
FIG. 12 is a diagram for explaining processes when a placement region is a space regarding the example shown in FIG. 7.
Figure 13:
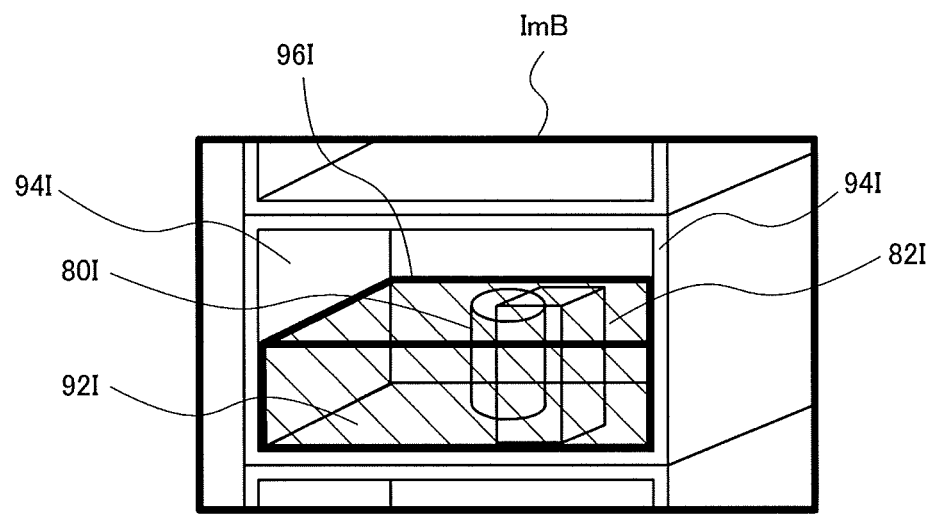
FIG. 13 is a diagram for explaining processes when a placement region is a space regarding the example shown in FIG. 7.
Figure 14:
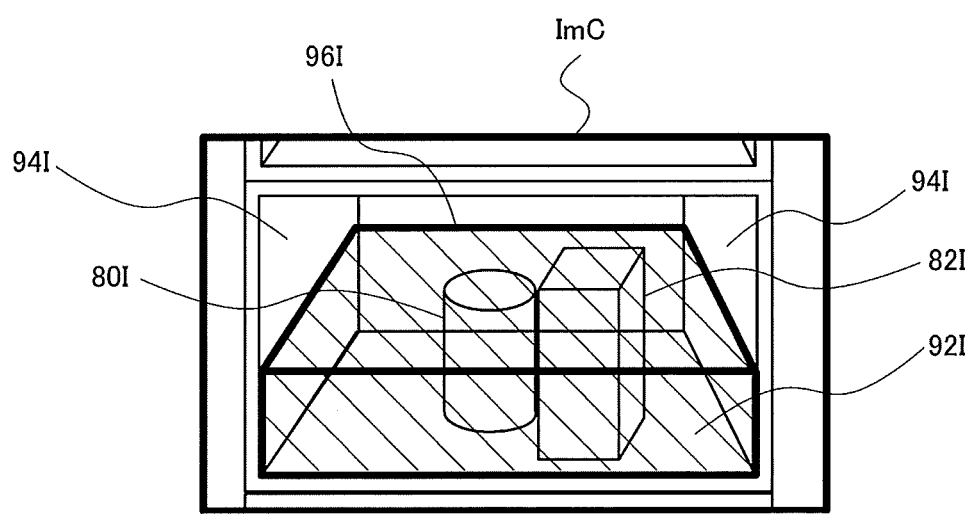
FIG. 14 is a diagram for explaining processes when a placement region is a space regarding the example shown in FIG. 7.

FIGS. 12 to 14 are diagrams for explaining the processes when the placement region is a space regarding the example shown in FIG. 7. FIG. 12 shows the distance image ImA viewed from the viewpoint A. FIG. 13 shows the distance image ImB viewed from the viewpoint B. FIG. 14 shows the distance image ImC viewed from the viewpoint C.

In the distance image ImA shown in FIG. 12, a part of the left side of the surface 92a of the shelf board 92A on which the target object 80 is placed is shielded by the wall surface 94. Accordingly, in the distance image ImA, the shelf board surface image 92I related to the shelf board 92A on which the target object 80 is placed reflects only a part of the surface 92a of the shelf board 92A in such a manner as to collide with the wall surface image 94I. Then, the trajectory when the surface 92a of the shelf board 92A, which is the placement surface, is imaginarily moved vertically upward by a distance corresponding to the height of the target object 80 is defined as a placement space. A placement space image 96I (the part indicated by the bold line in FIG. 12) which is an image showing this placement space corresponds to the placement region.

In the distance image ImB shown in FIG. 13, a part of the right side of the surface 92a of the shelf board 92A on which the target object 80 is placed is shielded by the wall surface 94. Accordingly, in the distance image ImB, the shelf board surface image 92I reflects only a part of the surface 92a of the shelf board 92A in such a manner as to collide with the wall surface image 94I. Then, the trajectory when the surface 92a of the shelf board 92A is imaginarily moved vertically upward by a distance corresponding to the height of the target object 80 is defined as the placement space. The placement space image 96I (the part indicated by the bold line in FIG. 13) which is an image showing this placement space corresponds to the placement region.

In the distance image ImC shown in FIG. 14, the surface 92a of the shelf board 92A on which the target object 80 is placed is not shielded by the right and left wall surfaces 94. Accordingly, in the distance image ImC, the shelf board surface image 92I reflects the entire surface 92a of the shelf board 92A without colliding with the wall surface images 94I. Then, the trajectory when the surface 92a of the shelf board 92A is imaginarily moved vertically upward by a distance corresponding to the height of the target object 80 is defined as the placement space. The placement space image 96I (the part indicated by the bold line in FIG. 14) which is an image showing this placement space corresponds to the placement region.

For each of FIGS. 12 to 14, the calculation unit 130 respectively calculates a size of the placement space image 96I (hatched areas in FIGS. 12 to 14) corresponding to the placement region on which the target object 80 is placed. Note that as described above, the calculation unit 130 calculates a size (a ratio of the number of pixels of the placement space image 96I to the entire distance image) of the placement region assuming that there are no target object 80I and no non-target object 82I. On the other hand, the calculation unit 130 calculates a size of the placement region with consideration given to presence of the wall surface images 94I. Accordingly, as shown in FIGS. 12 to 14, edges of the placement space image 96I corresponding to the placement region are formed by the wall surface images 94I.

Note that as described above, among the distance images related to the viewpoints A to C shown in FIGS. 12 to 14, it is easiest to recognize the target object 80 in the distance image ImA (FIG. 12) related to the viewpoint A. Meanwhile, among the distance images related to the viewpoints A to C shown in FIGS. 12 to 14, the distance image ImC (FIG. 14) related to the viewpoint C has the largest size of the placement space image 96I in the distance images. Therefore, the image selection unit 132 selects the distance image ImC shown in FIG. 14, and the viewpoint position determination unit 134 determines the viewpoint C corresponding to the distance image ImC as an optimal viewpoint position.

COMPARATIVE EXAMPLE

Next, a comparative example is described. The comparative example is different from the first embodiment in that a viewpoint where the target object 80 is easily recognized when the three-dimensional environmental information (three-dimensional environmental map) has been generated is determined to be an optimal viewpoint position.

Figure 15:
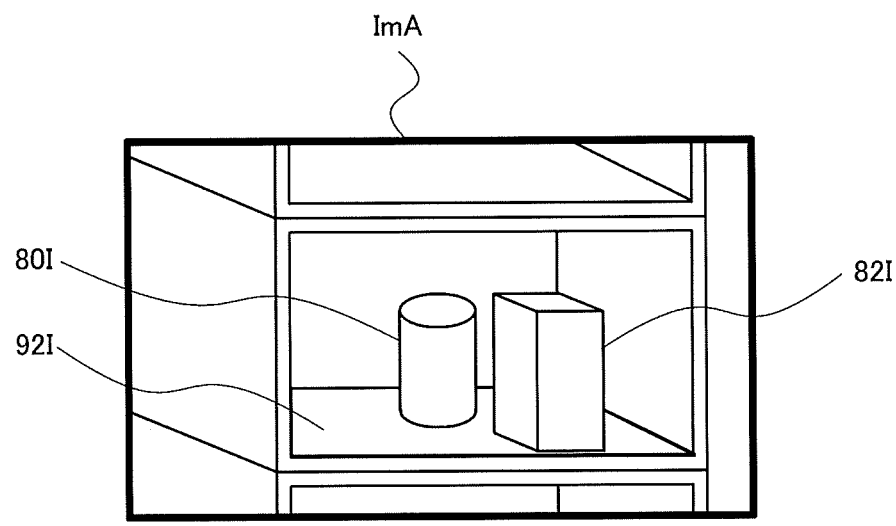
FIG. 15 is a diagram for explaining processes of determining an optimal viewpoint position in a comparative example.
Figure 16:
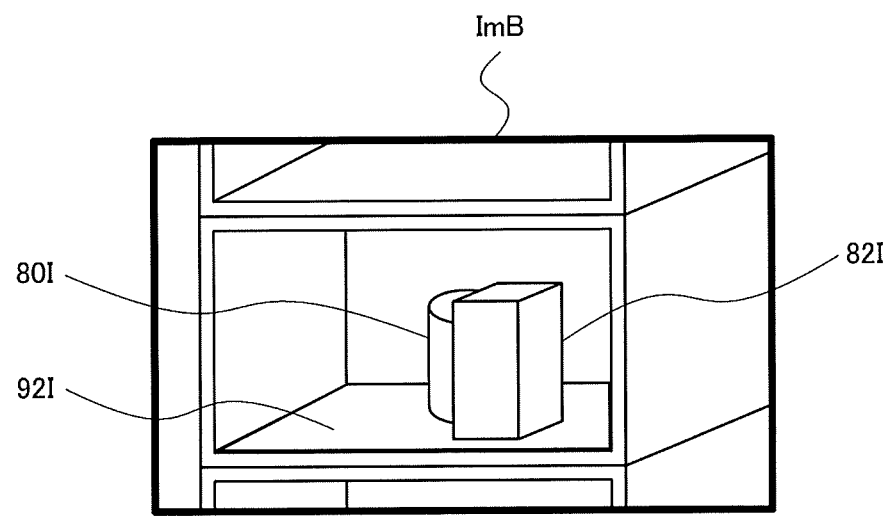
FIG. 16 is a diagram for explaining processes of determining an optimal viewpoint position in a comparative example.

FIGS. 15 and 16 are diagrams for explaining processes of determining the optimal viewpoint position in the comparative example. FIG. 15 shows the distance image ImA viewed from the viewpoint A when the three-dimensional environmental information has been generated regarding the example shown in FIG. 7. FIG. 16 shows the distance image ImB viewed from the viewpoint B when the three-dimensional environmental information has been generated regarding the example shown in FIG. 7. When the three-dimensional environmental information has been generated, the non-target object 82 is placed on the right side of the target object 80. Accordingly, when the three-dimensional environmental information has been generated, it is easier to recognize the object 80 when it is viewed from the viewpoint A as shown in FIG. 15 than when it is viewed from the viewpoint B as shown in FIG. 16. Therefore, in the comparative example, the viewpoint A is determined as the optimal viewpoint position.

Figure 17:
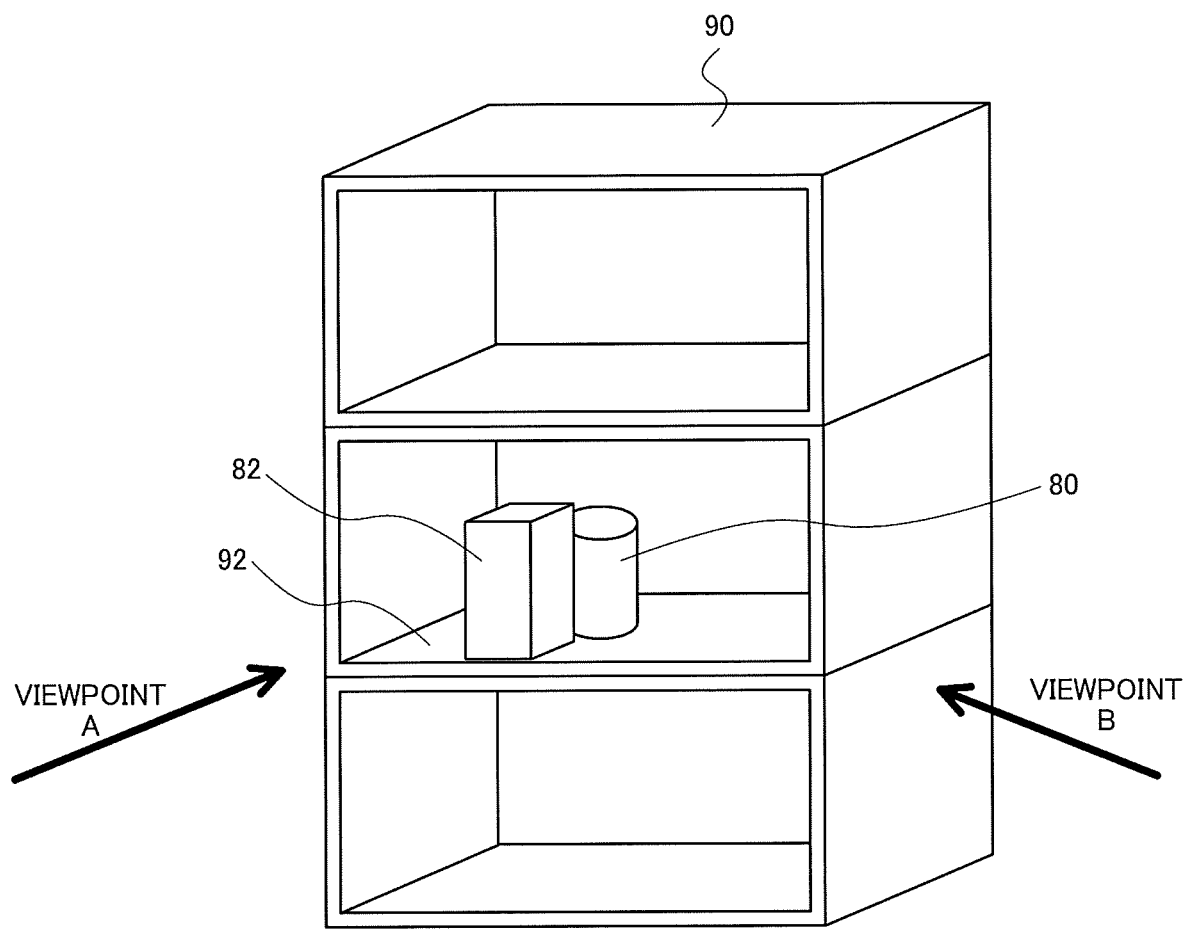
FIG. 17 is a diagram for explaining a problem in a comparative example.
Figure 18:
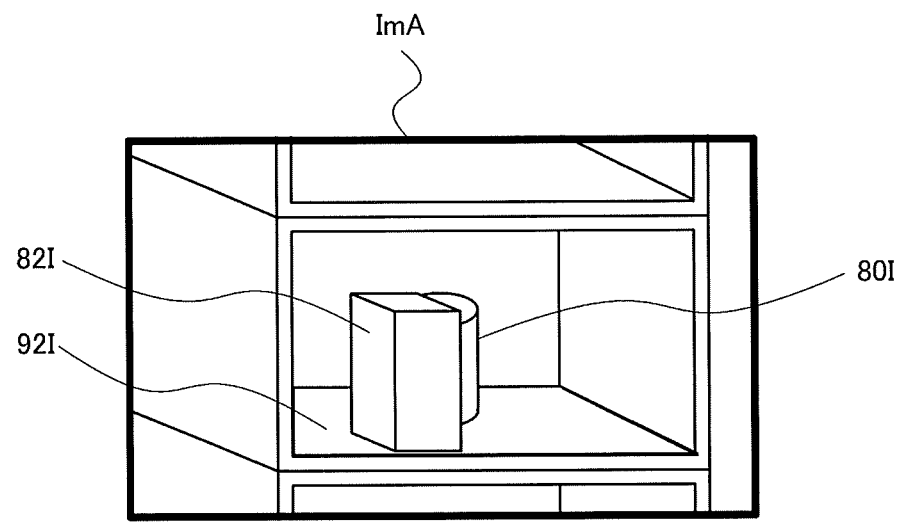
FIG. 18 is a diagram for explaining a problem in a comparative example.
Figure 19:
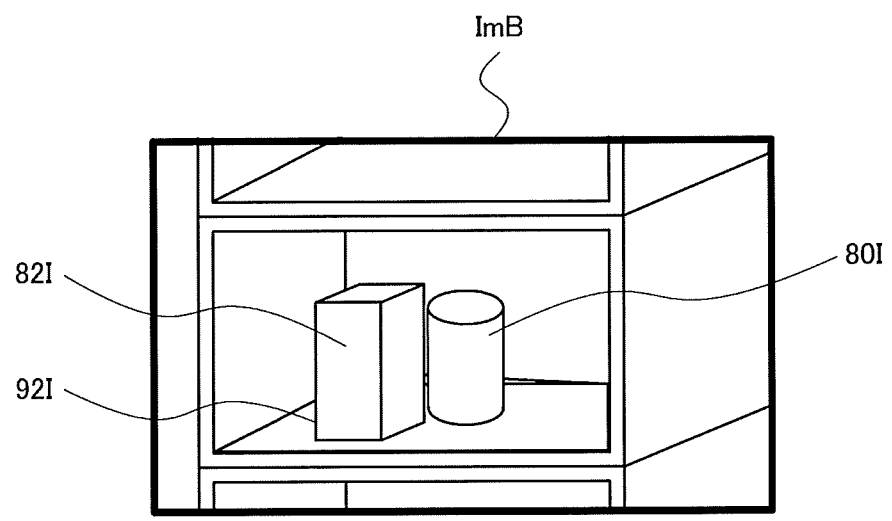
FIG. 19 is a diagram for explaining a problem in a comparative example.

FIGS. 17 to 19 are diagrams for explaining problems in the comparative example. FIG. 17 shows a state in which a relative positional relation between the target object 80 and the non-target object 82 has been changed after the three-dimensional environmental information has been generated. As shown in FIG. 17, it is assumed that after the three-dimensional environmental information has been generated, the non-target object 82 was moved to the left.

FIG. 18 shows the distance image ImA viewed from the viewpoint A in the state shown in FIG. 17. FIG. 19 shows the distance image ImB viewed from the viewpoint B in the state shown in FIG. 17. Since the non-target object 82 was moved to the left, the non-target object 82 is present on the left side of the target object 80. Accordingly, it is difficult to recognize the target object 80 from the viewpoint A. That is, when the positional relation between the target object 80 and the non-target object 82 has been changed as shown in FIG. 17, it is easier to recognize the object 80 when it is viewed from the viewpoint B as shown in FIG. 19 than when it is viewed from the viewpoint A as shown in FIG. 18. As described above, the viewpoint position which is optimal when the three-dimensional environmental information has been generated is not always optimal also when a search for the target object 80 is made again.

As in the comparative example, in the method for determining, as an optimal viewpoint position, a viewpoint in which the target object 80 is easily recognized when the three-dimensional environmental information has been generated, there is a possibility that the target object 80 cannot be appropriately searched for in the determined optimal viewpoint position when a search for the target object 80 is made again. In such a case, since it can be necessary to greatly change the viewpoint position of the sensor 12 in order to search for the target object 80, a time required for searching may be increased. Accordingly, in the method according to the comparative example, there is a possibility that the target object 80 cannot be efficiently searched for.

On the other hand, in this embodiment, the position of the sensor 12, where the distance image having a larger sized placement region where the target object 80 is placed can be photographed, is determined as an optimal position. Further, by moving the sensor 12 to this optimal position to start a search for the target object 80 when a next search for the target object 80 is made, a possibility that the target object 80 can be recognized becomes high even when the relative positional relation between the target object 80 and the non-target object 82 is changed. That is, when the distance image is photographed in a viewpoint in which a size of the placement region is larger, a possibility that the target object 80 can be recognized regardless of whether there is the non-target object 82 becomes high. Further, even when the target object 80 is moved to the vicinity of the wall surfaces 94, a possibility that the target object 80 can be recognized is higher than that in the comparative example. Accordingly, the method according to this example makes it possible to efficiently search for the target object 80 even when a relative positional relation between the target object 80 and the non-target object 82 can be changed.

Note that in the example shown in FIG. 7, the image extraction unit 128 extracts the distance images ImA, ImB, and ImC which are viewed from three viewpoints. However, the image extraction unit 128 may extract two or more distance images. That is, the image extraction unit 128 may extract a plurality of distance images including the placement region. Further, the image extraction unit 128 may extract all the distance images including the placement region, which can be extracted. With such a configuration, the image selection unit 132 can select the distance image having the largest placement region among all the distance images. Accordingly, it is possible to more accurately determine the optimal viewpoint position where the target object can be efficiently searched for.

Further, as shown in FIGS. 9 to 11, by setting the placement region as a plane (placement surface), it is possible to reduce a calculation amount in the optimal viewpoint determination unit 120 as compared with the case where the placement region is set as a space region (placement space). Accordingly, by setting the placement region as a plane (placement surface), a time required for determining the optimal viewpoint position can be reduced. On the other hand, as shown in FIGS. 12 to 14, by setting the placement region as a space region (placement space), it is possible to provide the placement region in which the height of the target object 80 is taken into consideration. Accordingly, by setting the placement region as a space region (placement space), it is possible to more accurately determine the optimal viewpoint position where the target object 80 can be efficiently searched for as compared with the case where the placement region is set as a plane (placement surface).

Second Embodiment

Next, a second embodiment is described. The second embodiment is different from the first embodiment in the method for determining an optimal viewpoint position by the optimal viewpoint determination unit 120. Other configurations of the second embodiment are substantially the same as those in the first embodiment, and the description thereof is omitted.

Figure 20:
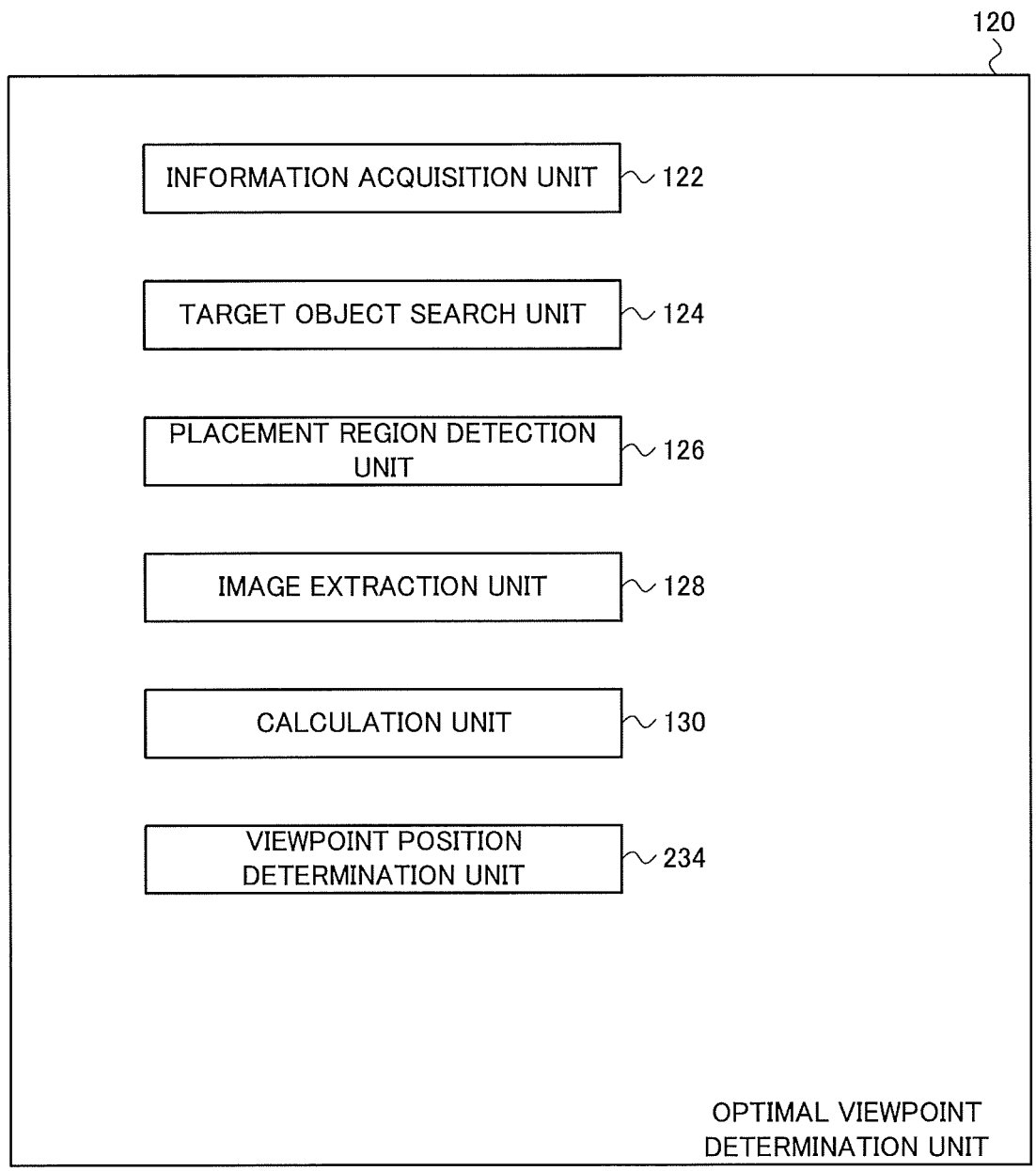
FIG. 20 is a block diagram showing a configuration of an optimal viewpoint determination unit according to a second embodiment.

FIG. 20 is a block diagram showing a configuration of the optimal viewpoint determination unit 120 according to the second embodiment. The optimal viewpoint determination unit 120 includes the information acquisition unit 122, the target object search unit 124, the placement region detection unit 126, the image extraction unit 128, the calculation unit 130, and a viewpoint position determination unit 234. Functions of each component of the optimal viewpoint determination unit 120 will be described later. Note that unlike the first embodiment, the optimal viewpoint determination unit 120 according to the second embodiment does not include the image selection unit. Further, processes performed by the viewpoint position determination unit 234 are different from those performed by the viewpoint position determination unit 134 according to the first embodiment.

Figure 21:
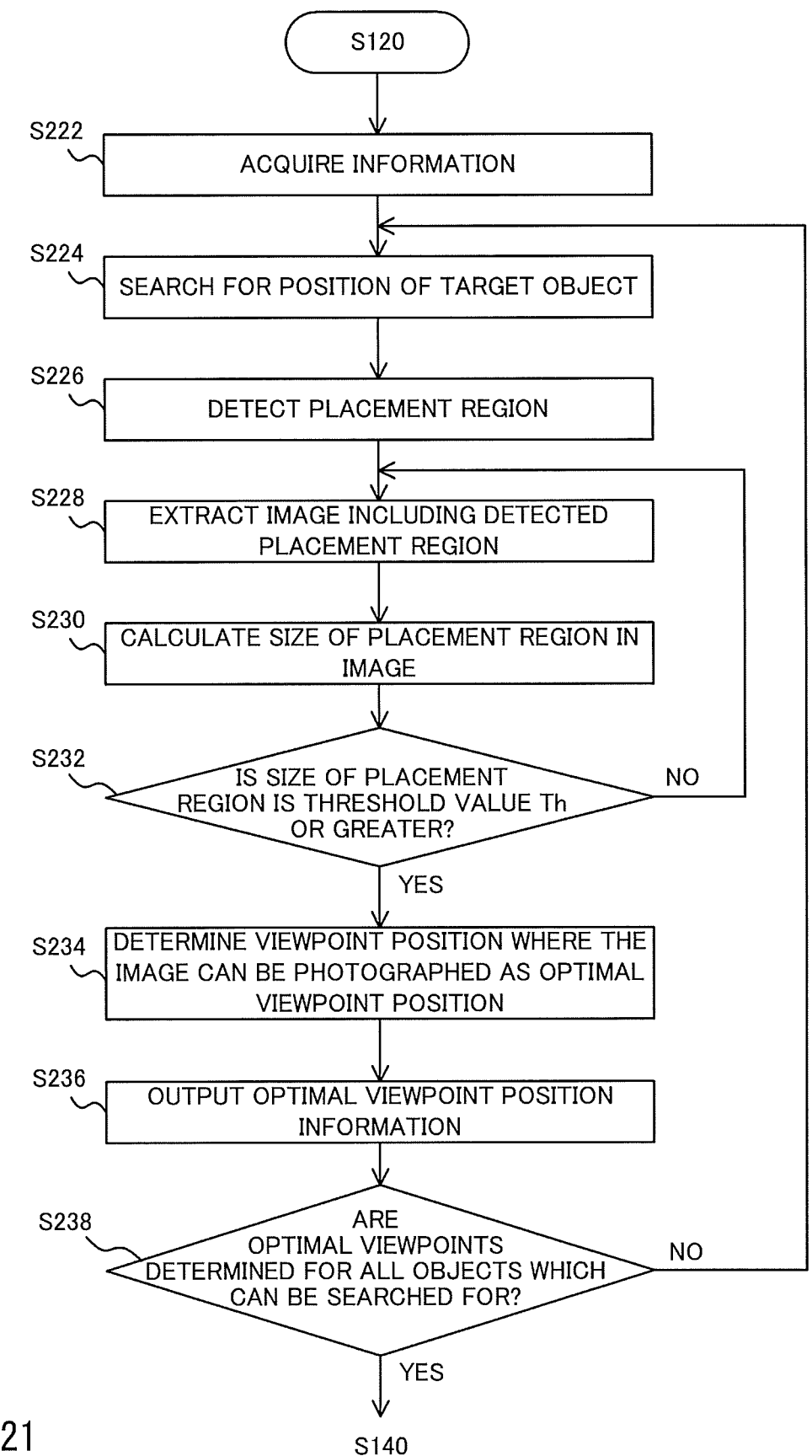
FIG. 21 is a flowchart showing processes performed by the optimal viewpoint determination unit according to the second embodiment.

FIG. 21 is a flowchart showing processes (S120 in FIG. 5) performed by the optimal viewpoint determination unit 120 according to the second embodiment. The information acquisition unit 122 acquires various information items in the same manner as that in the process of S122 shown in FIG. 6 (Step S222). The target object search unit 124 searches for a position of the target object 80 in the same manner as that in the process of S124 (Step S224). The placement region detection unit 126 uses the three-dimensional environmental information to detect, for the target object 80 of which the position is confirmed, a placement region where the target object 80 is placed in the same manner as that in the process of S126 (Step S226).

The image extraction unit 128 extracts, from the three-dimensional environmental information, an image including the placement region detected in the process of S226 (Step S228). Note that unlike the first embodiment, the image extraction unit 128 may extract one arbitrary image in Step S228. The calculation unit 130 calculates a size (for example, a ratio of the number of pixels of the placement region to the total number of pixels) of the placement region in the image extracted in the process of S228 in the same manner as that in the process of S130 (Step S230).

The viewpoint position determination unit 234 determines whether or not a size of the placement region calculated in the process of S230 is equal or greater than a predetermined threshold value Th (Step S232). The threshold value Th can be arbitrarily determined as a value required to determine at least an optimal viewpoint position where the target object 80 can be detected efficiently. When a size of the placement region is not equal to or greater than the threshold value Th (NO in S232), the process returns to S228 and the image extraction unit 128 extracts another image including the placement region (S228). Then, the processes from S230 to S232 are performed repeatedly.

On the other hand, when a size of the placement region is equal to or greater than the threshold value Th (YES in S232), the viewpoint position determination unit 234 determines the viewpoint position where the image can be photographed as an optimal viewpoint position (Step S234). The viewpoint position determination unit 234 outputs optimal viewpoint position information indicating the optimal viewpoint position (Step S236). The optimal viewpoint determination unit 120 determines whether or not optimal viewpoints have been determined for all the objects which can be searched for (Step S238). When optimal viewpoints for all the objects (target objects 80) are not determined (NO in S238), the optimal viewpoint determination unit 120 performs the processes from S224 to S236 on the objects for which the optimal viewpoints are not determined. When optimal viewpoints for all the objects (target objects 80) are determined (YES in S238), the optimal viewpoint determination unit 120 ends the processes of S120 shown in FIG. 21.

In the second embodiment, the position of the sensor 12, where the distance image having a larger sized placement region where the target object 80 is placed can be photographed, is determined as an optimal position when a next search for the target object 80 is made. Therefore, by moving the sensor 12 to this optimal position to start a search for the target object 80, a possibility that the target object 80 can be recognized becomes high even when a relative positional relation between the target object 80 and the non-target object 82 is changed. Accordingly, in the second embodiment, it is possible to efficiently search for the target object 80 even when a relative positional relation between the target object 80 and the non-target object 82 can be changed Further, in the second embodiment, the viewpoint position determination unit 234 determines, as an optimal viewpoint position, the viewpoint position where the image including the placement region of which the size is equal to or greater than the threshold value Th can be photographed. Thus, when a size of the placement region in the distance image falls within an allowable range in determining an optimal viewpoint position, it is possible to end the process without performing it on another image. Accordingly, in the method according to the second embodiment, the optimal viewpoint position can be determined more quickly than that in the method according to the first embodiment.

On the other hand, in the second embodiment, since the processes may not be performed on a plurality of distance images, there is a possibility that the distance image having the placement region larger than that of the distance image corresponding to the optimal viewpoint position determined by the method according to the second embodiment may be present. Accordingly, in the method according to the second embodiment, there is a possibility that an accuracy in determination of an optimal viewpoint position is inferior to that of the method according to the first embodiment. In other words, the method according to the first embodiment makes it possible to determine a viewpoint position where the target object 80 can be more efficiently searched for than that in the method according to the second embodiment.

MODIFIED EXAMPLE

Note that the present disclosure is not limited to the above-described embodiments and they can be modified as desired without departing from the scope and spirit of the disclosure. For example, the order of steps in the flowchart shown in FIG. 5, etc. can be changed as desired. Further, one or more steps in the flowchart shown in FIG. 5, etc. may be omitted. Further, although the optimal viewpoint position information indicates three-dimensional coordinates and an orientation (angle) of the optimal viewpoint position in the three-dimensional environment in the above-described embodiments, the present disclosure is not limited to such configurations. The optimal viewpoint position information may indicate three-dimensional coordinates of the optimal viewpoint position in the three-dimensional environment.

Further, although the sensor 12 is a distance sensor in the above-described embodiments, the present disclosure is not limited to such configurations. The sensor 12 may be a two-dimensional sensor as long as it can recognize an object and a placement region. However, by using a distance sensor, it is possible to easily recognize an object and a placement region without performing complex image processing (such as edge detection and pattern matching).

Further, the placement region may be a region obtained by excluding a region where the target object 80 cannot be placed. For example, in the example shown in FIG. 7, the cylindrical target object 80 cannot be placed at a corner of the surface 92a of the shelf board 92. Therefore, parts corresponding to four corners of the surface 92a may be excluded from the placement region.

Further, the target object 80 and the non-target object 82 do not need to be placed on the shelf board 92. For example, the target object 80 may be hooked on a hook provided on the wall surface 94. In this case, the "placement region" corresponds to the wall surfaces 94. When the target object 80 is determined not to be placed on the shelf board 92 and a wall behind the target object 80 can be recognized, the wall surface 94 may be detected as the "placement region". Further, the target object 80 and the non-target object 82 do not need to be placed (stored) in the storage object 90. The target object 80 and the non-target object 82 may be placed on the floor surface in the three-dimensional environment 4. In this case, a predetermined area of the floor surface in which the target object 80 is set as a center may be the placement surface.

Further, in the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sensor control device configured to control a sensor searching for a target object to be searched for in a three-dimensional environment, comprising:
   hardware, including at least one memory configured to store a computer program and at least one processor configured to execute the computer program;
   a three-dimensional environmental information acquisition unit, implemented by the hardware, configured to acquire three-dimensional environmental information indicating each point on an object present in the three-dimensional environment;
   a region detection unit, implemented by the hardware, configured to detect a placement region where the target object is placed by using the three-dimensional environmental information, the placement region being a placement surface which includes a contact surface in contact with the target object and is continuous with the contact surface or being a placement space which is a space where the placement surface is a bottom surface and includes the target object;
   a calculation unit, implemented by the hardware, configured to calculate a size of the placement region in at least one image data representing an image including the placement region;
   a position determination unit, implemented by the hardware, configured to determine, among a plurality of sensor positions where the sensor photographing an image related to the image data can be placed, a sensor position where the placement region is larger than the placement region in the case of using image data of another sensor position, as an optimal position; and
   a sensor position control unit, implemented by the hardware, configured to perform control, when a search for the target object is made after the optimal position has been determined, so as to move the sensor to the optimal position and then start the search for the target object.

2. The sensor control device according to claim 1, wherein the calculation unit calculates a size of the placement region in two or more of the image data indicating an image including the placement region, and
   the position determination unit determines, among the two or more of the image data, the sensor position where an image related to the image data having the largest size of the placement region can be photographed as the optimal position.

3. The sensor control device according to claim 2, further comprising an image extraction unit, implemented by the hardware, configured to extract an image including the placement region, wherein
   the calculation unit calculates a size of the placement region in all the image data that can be extracted by the image extraction unit, the image data representing the image including the placement region, and
   the position determination unit determines, among all the image data, the sensor position where an image related to the image data having the largest size of the placement region can be photographed as the optimal position.

4. The sensor control device according to claim 1, wherein the position determination unit determines, as the optimal position, the sensor position where an image related to the image data in which a size of the placement region is a predetermined threshold value or greater can be photographed.

5. The sensor control device according to claim 1, wherein the placement region corresponds to the placement surface.

6. The sensor control device according to claim 1, wherein the placement region corresponds to the placement space.

7. An object search system, comprising:
   a sensor configured to search for a target object to be searched for in a three-dimensional environment; and a sensor control device configured to control the sensor, the sensor control device comprising:
   hardware, including at least one memory configured to store a computer program and at least one processor configured to execute the computer program;
   a three-dimensional environmental information acquisition unit, implemented by the hardware, configured to acquire three-dimensional environmental information indicating each point on an object present in the three-dimensional environment;
   a region detection unit, implemented by the hardware, configured to detect a placement region where the target object is placed by using the three-dimensional environmental information, the placement region being a placement surface which includes a contact surface in contact with the target object and is continuous with the contact surface or being a placement space which is a space where the placement surface is a bottom surface and includes the target object;
   a calculation unit, implemented by the hardware, configured to calculate a size of the placement region in at least one image data representing an image including the placement region;
   a position determination unit, implemented by the hardware, configured to determine, among a plurality of sensor positions where the sensor photographing an image related to the image data can be placed, a sensor position where the placement region is larger than the placement region in the case of using image data of another sensor position, as an optimal position; and
   a sensor position control unit, implemented by the hardware, configured to perform control, when a search for the target object is made after the optimal position has been determined, so as to move the sensor to the optimal position and then start the search for the target object.

8. An object search method for searching for a target object to be searched for in a three-dimensional environment, comprising:
   acquiring three-dimensional environmental information indicating each point on an object present in the three-dimensional environment;
   detecting a placement region where the target object is placed by using the three-dimensional environmental information, the placement region being a placement surface which includes a contact surface in contact with the target object and is continuous with the contact surface or being a placement space which is a space where the placement surface is a bottom surface and includes the target object;
   calculating a size of the placement region in at least one image data representing an image including the placement region;
   determining, among a plurality of sensor positions where the sensor photographing an image related to the image data can be placed, a sensor position where the placement region is larger than the placement region in the case of using image data of another sensor position, as an optimal position; and controlling the sensor, when a search for the target object is made after the optimal position has been determined, so as to move the sensor to the optimal position and then start the search for the target object.

9. A non-transitory computer readable medium storing a program for performing an object search method in which a target object to be searched for is searched for in a three-dimensional environment, the program being adapted to cause a computer to perform:

acquiring three-dimensional environmental information indicating each point on an object present in the three-dimensional environment;

detecting a placement region where the target object is placed by using the three-dimensional environmental information, the placement region being a placement surface which includes a contact surface in contact with the target object and is continuous with the contact surface or being a placement space which is a space where the placement surface is a bottom surface and includes the target object;

calculating a size of the placement region in at least one image data representing an image including the placement region;

determining, among a plurality of sensor positions where the sensor photographing an image related to the image data can be placed, a sensor position where the placement region is larger than the placement region in the case of using image data of another sensor position, as an optimal position; and controlling the sensor, when a search for the target object is made after the optimal position has been determined, so as to move the sensor to the optimal position and then start the search for the target object.

* * * * *